(12) United States Patent
Blondelet et al.

(10) Patent No.: US 7,234,708 B2
(45) Date of Patent: Jun. 26, 2007

(54) SUSPENSION DEVICE OF A MOTOR VEHICLE WHEEL

(75) Inventors: Michel Blondelet, Le-Crest (FR); Grigore Gogu, Aubiere (FR); Olivier Piffard, Mauldin, SC (US); Loïc Serra, Tallende (FR); Davy Vernier, Clermont-Ferrand (FR); François Andre, Romagnat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 323 days.

(21) Appl. No.: 10/624,841

(22) Filed: Jul. 23, 2003

(65) Prior Publication Data
US 2005/0051976 A1 Mar. 10, 2005

Related U.S. Application Data

(63) Continuation of application No. PCT/EP02/00563, filed on Jan. 21, 2001.

(30) Foreign Application Priority Data

Jan. 23, 2001 (FR) .................................... 01 01181
Dec. 12, 2001 (FR) .................................... 01 16168

(51) Int. Cl.
*B60G 3/26* (2006.01)
(52) U.S. Cl. .................................................. 280/5.521
(58) Field of Classification Search ............ 280/5.521, 280/5.52, 124.106, 124.107
See application file for complete search history.

(56) References Cited

U.S. PATENT DOCUMENTS

| | | | |
|---|---|---|---|
| 2,689,747 A | 9/1954 | Kolbe | |
| 3,137,513 A | 6/1964 | Marot | |
| 3,497,233 A | 2/1970 | Bolaski, Jr. | |
| 3,729,210 A | 4/1973 | Cunningham, Jr. | |
| 4,515,390 A | 5/1985 | Greenberg | |
| 4,854,603 A * | 8/1989 | Scaduto | 280/124.107 |
| 5,116,069 A | 5/1992 | Miller | |
| 5,821,434 A | 10/1998 | Halliday | |
| 6,170,838 B1 | 1/2001 | Laurent et al. | |
| 6,189,897 B1 * | 2/2001 | Santa Cruz et al. | 280/5.506 |
| 6,250,649 B1 | 6/2001 | Braun | |
| 6,467,783 B1 * | 10/2002 | Blondelet et al. | 280/124.106 |
| 6,511,078 B2 * | 1/2003 | Sebe | 280/5.509 |

(Continued)

FOREIGN PATENT DOCUMENTS

DE 40 29 288 A1 3/1991

(Continued)

*Primary Examiner*—Faye M. Fleming
(74) *Attorney, Agent, or Firm*—Buchanan Ingersoll & Rooney PC

(57) ABSTRACT

In a suspension system that connects a wheel support to a vehicle body, the wheel support is designed to carry a wheel of radius "r", the wheel is intended to rest on the ground via a contact area, the system includes an arrangement that confers upon the wheel support, relative to the body, a degree of freedom of the camber and a degree of freedom of the deflection of the suspension that are independent of one another. The system is configured such that the camber movement of the wheel support relative to the body has, around a mean position, an instantaneous center of rotation (CIR r/c) located within a range from 2.5 r above ground to r below ground.

19 Claims, 13 Drawing Sheets

U.S. PATENT DOCUMENTS 6,513,819 B1 * 2/2003 Oliver et al. ......... 280/124.152

FOREIGN PATENT DOCUMENTS

| | | |
|---|---|---|
| DE | 41 02 313 A1 | 7/1992 |
| DE | 196 08 578 A1 | 9/1997 |
| DE | 197 17 418 C1 | 10/1998 |
| EP | 0 878 378 B1 | 11/1998 |
| EP | 1 070 609 A1 | 1/2001 |
| FR | 967710 | 11/1950 |
| FR | 1108823 | 1/1956 |
| FR | 1252770 | 2/1961 |
| FR | 2004863 | 12/1969 |
| GB | 434330 | 8/1935 |
| GB | 1526970 | 10/1978 |

* cited by examiner

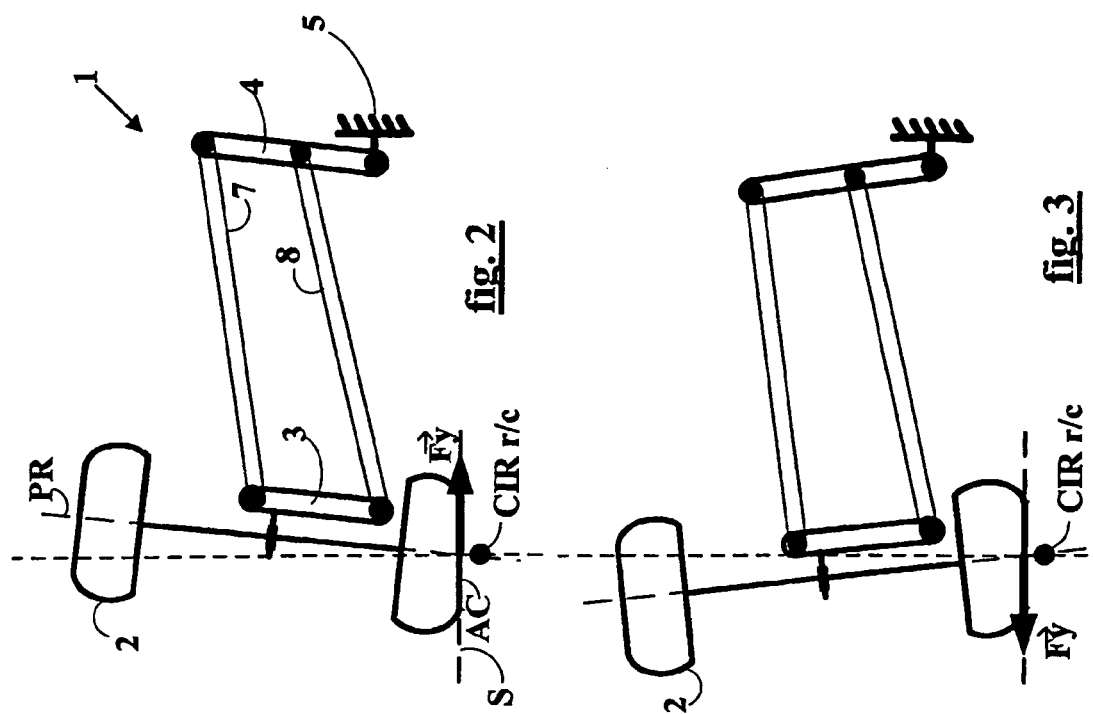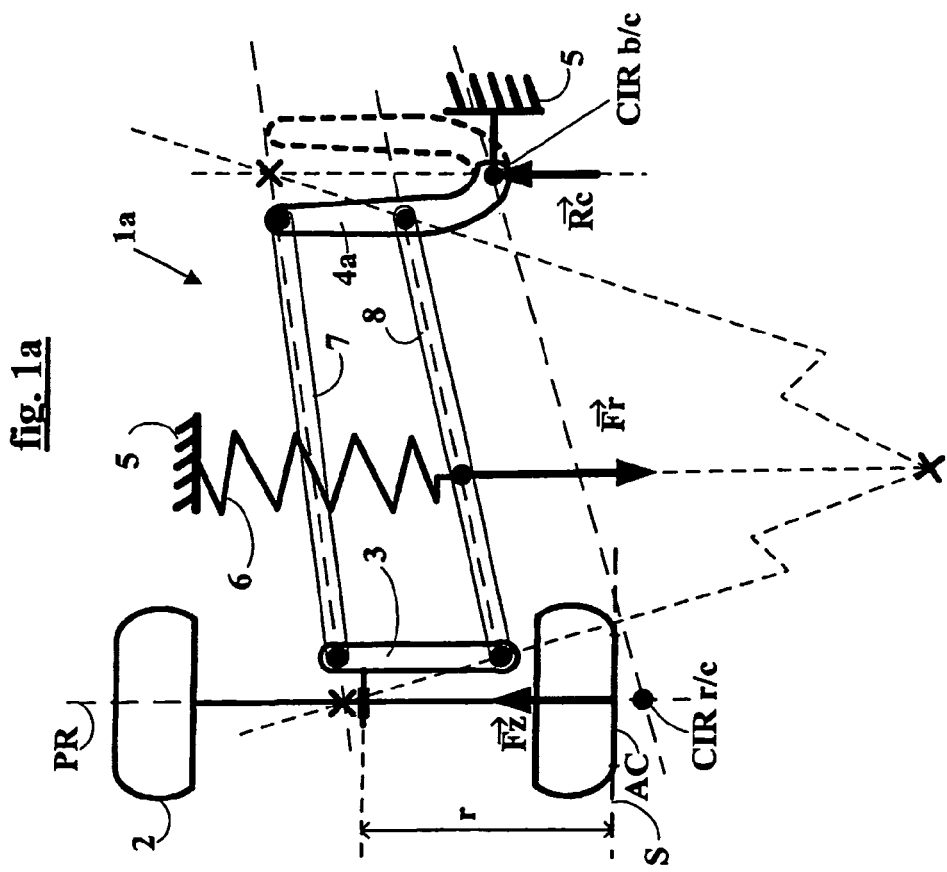

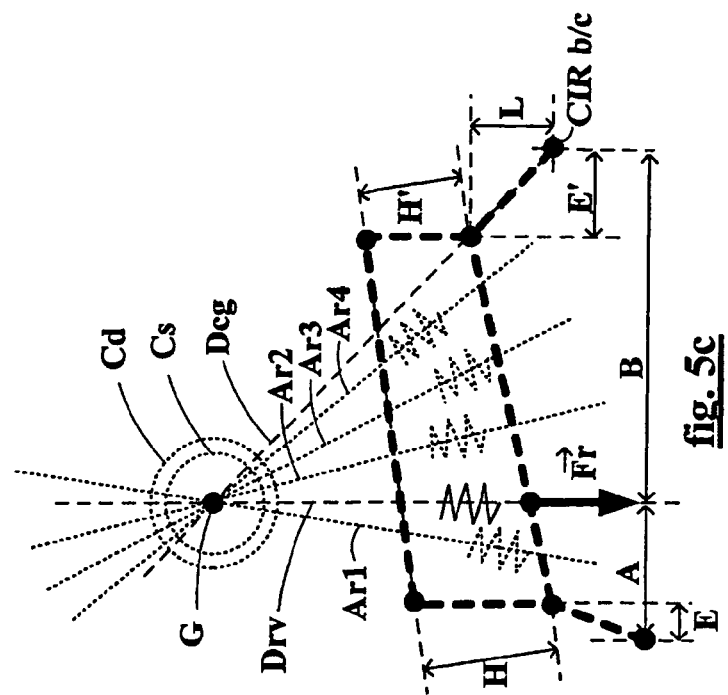
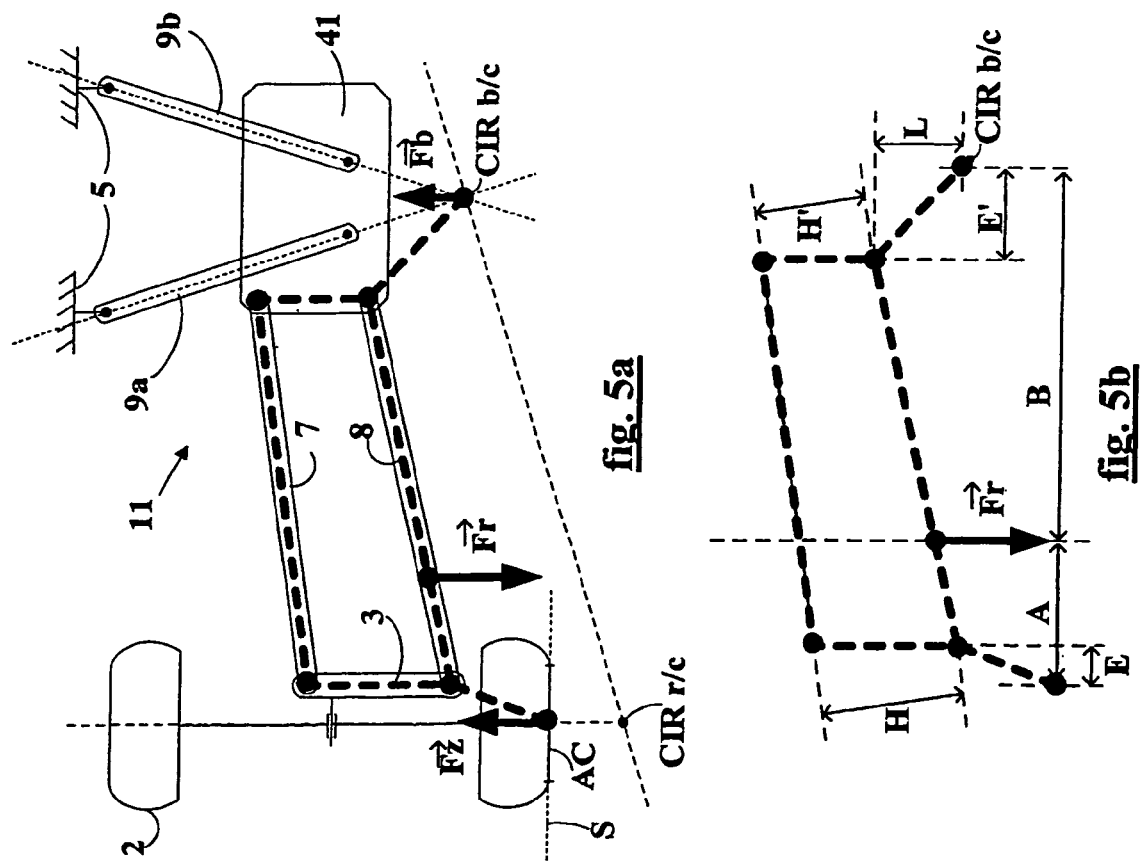
fig. 5a
fig. 5b
fig. 5c

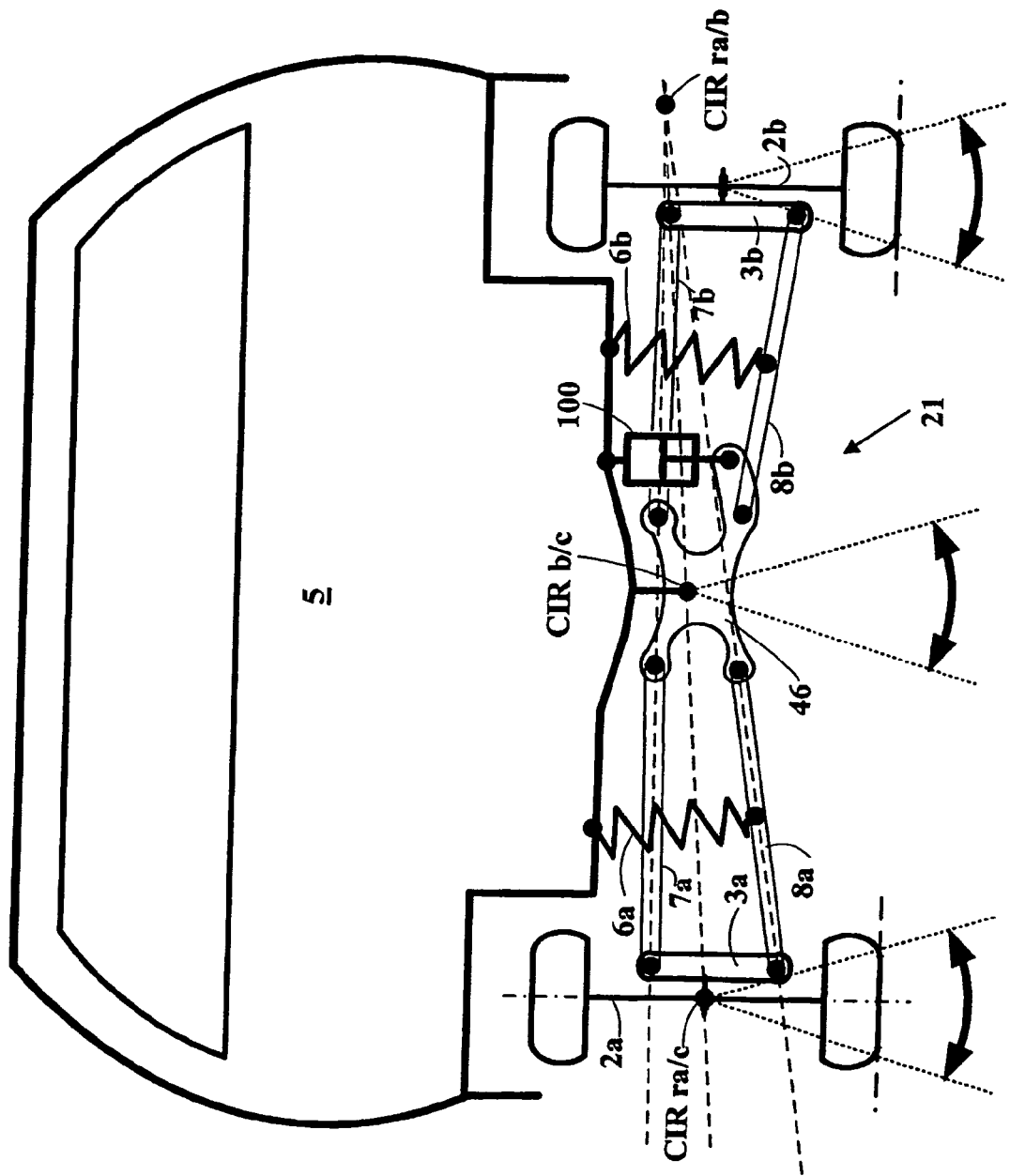

SUSPENSION DEVICE OF A MOTOR VEHICLE WHEEL

This application is a continuation divisional of application Ser. No. PCT/EP02/00563, filed on Jan. 21, 2001.

The present invention concerns vehicle chassis systems, in particular suspension systems and more particularly the guiding of the wheels.

Suspension systems have two main functions, which must co-exist at all times during operation. One of those functions is to provide suspension for the vehicle, that is to say, to allow each wheel to move up and down essentially vertically as a function of the load on the wheel. The other function of such systems is to guide the wheel, in other words to control the angular position of the wheel plane.

The "wheel plane" is the plane associated with the wheel which is perpendicular to the wheel's axis and passes through the center of the contact area with the ground. The angular position of the wheel plane relative to the body of the vehicle is defined by two angles, the camber angle and the steering angle. The camber angle of a wheel is the angle which, in a transverse plane perpendicular to the ground, separates the wheel plane from the median plane of the vehicle. This angle is positive when the top of the wheel is tilted away from the median plane towards the outside of the vehicle, and this is commonly termed "camber" or "positive camber". Conversely, when the angle is negative this is called "reverse" or "negative camber". The steering angle of a wheel is the angle which, in a horizontal plane parallel to the ground, separates the wheel plane from the median plane of the vehicle.

In most vehicles the camber angle ("camber" will be used for "camber angle" in what follows) is fixed for a particular position of the suspension and steering, i.e. it can theoretically not vary independently of the deflection of the suspension or of the steering. However, it undergoes variations induced by the deformation of the elements constituting the suspension system brought about by the forces exerted on the wheel by the ground. These variations can be considerable. For example, in a modem passenger car the camber can vary several degrees under the transverse forces on the tire when going round a bend, independently of the rolling contribution made by the vehicle body (which is generally inclined in the same direction under the action of centrifugal force). This "elastic" camber variation causes the camber to tend towards positive values for the wheel on the outside of the bend. For a long time these predictable variations have been allowed for in design or control compromises of the suspension systems of modem vehicles, to limit their undesirable effects on the operation of the chassis.

In effect, camber greatly influences vehicle handling the performance of the chassis contact system. In particular, the performance of a tire varies a lot depending on the configuration of its contact area, and that configuration depends largely on the camber. It is these variations which mainly motivate the choice of the static camber angle. Thus, for example, a large static negative camber is generally used in a racing vehicle to compensate variations caused by tire deformations, even though the elements of the suspension are much more rigid than in passenger vehicles, or by the rolling of the body. This configuration is both useful and acceptable in racing because the criteria of grip around bends are then predominant. In contrast, in a passenger vehicle, since tire wear and stability in a straight line carry more weight in the compromise sought, a very slightly negative initial static camber is chosen and lower slip thrusts are tolerated, mainly around bends, when the effects of deformations of the tire and the ground contact elements under the lateral forces upon the position of the wheel plane are added to the effects of vehicle roll.

To optimise the camber, especially during transverse accelerations, suspension systems have been designed whose camber varies as a function of the vertical deflection of the wheel. In this way the body roll of the vehicle can induce a useful variation of the camber which partly or fully compensates the inclination of the vehicle's body and the deformations described above. This is the case in the so-termed "multi-arm" systems. Such systems require specific vehicle design and structure which, for reasons related to space requirement and cost, cannot be implemented on most current vehicles. These systems only react in response (deflection, roll) to a transverse acceleration and not to the forces that give rise to it, and this on the one hand delays the effect of the correction and on the other hand compels tolerance of a rolling motion generally greater than that which a user might find comfortable. Moreover, to enable a sufficient camber variation, the kinematics of such systems entail displacements of the contact area relative to the vehicle, known as "track variations", and these variations can also be disturbing. Thus, the camber correction amplitude made possible by such systems is relatively limited.

From the kinematic point of view, in terms of degrees of freedom, suspension systems generally have only one degree of freedom (of the wheel or wheel support relative to the vehicle). This degree of freedom allows vertical suspension movements which, as just described, can be combined with limited camber variations.

However, systems are known in which the camber control is active, in other words the geometry modifications are brought about by movements of jacks as described for example in the documents U.S. Pat. No. 4,515,390 and DE 19717418. These systems allow at least one additional degree of freedom controlled by actuators. Such systems are very particular since they cannot be used on most ordinary vehicles, especially because of the space they occupy and the high power required for the actuators. Besides, the camber variations are accompanied by large body height or track variations.

One purpose of the present invention is to provide a suspension system of simple design that enables the camber to be controlled without or with low energy input, essentially independently of the vertical oscillations of the suspension and, more generally, the movements of the vehicle body, and that enables track variations to be minimised.

This objective is achieved by a suspension system in which a wheel support is connected to a vehicle body, the wheel support being designed to support a wheel of radius 'r', the wheel being designed to rest on the ground on a contact area, the system comprising means that provide the wheel support, relative to the body, with a degree of freedom of the camber and a degree of freedom of the suspension deflection which are independent of one another, wherein the system is configured such that the camber movement of the wheel support relative to the body has an instantaneous center of rotation about a mean position located within a range from 2.5 r above ground to r below ground. The suspension system according to the invention in effect has two degrees of freedom that allow independent suspension and camber movements. The camber movement takes place around an instantaneous center of rotation located a limited distance away from the contact area so as to limit track variations during the camber or reverse camber movement and to limit the energy input required in the case of active camber control.

In a preferred embodiment, the instantaneous center of rotation is located within a range from 0.3 r above ground to 0.5 r below the ground, preferably 0.2 r above ground to 0.4 r below ground, and more preferably still, from 0.1 r above ground to 0.3 r below ground.

In other preferred embodiments the instantaneous center of rotation is located within a range from 0.5 r to 1.5 r above the ground, or alternatively from 1.5 r to 2.2 r above the ground.

To ensure stable operation, the system is preferably configured such that the transverse force exerted by the ground on the wheel in the contact area generated during small suspension movements around the mean position does not exceed a limit corresponding to 0.1 P, "P" being the axle load, and is also preferably configured such that the transverse force exerted by the ground on the wheel in the contact area generated during large suspension movements does not exceed a limit corresponding to 0.3 P.

Preferably, the system comprises a rocker connected on one side to the body and on the other side to the wheel support, such that the link of the rocker to the body allows the degree of camber freedom.

To allow operation the instantaneous center of rotation may preferably be located below ground level so that transverse forces exerted by the ground on the wheel in the contact area induce an inclination of the wheel support relative to the body in the direction of decreasing camber when the transverse forces are directed towards the outside of the vehicle. In the case of passive operation related to the transverse forces, the system may comprise means to measure the displacement of the rocker or alternatively means to measure the torque exerted on the rocker in order to deduce the transverse forces.

Preferably, the rocker is connected to the body by two rods shaped so as to allow the camber movement of the wheel support by virtue of an instantaneous rotation movement of the rocker relative to the body. In this case the rods are preferably articulated via at least one elastomeric articulation. Alternatively, the rocker can for example be connected to the body by a curved slider shaped so as to enable the camber movement of the wheel support by virtue of an instantaneous rotation movement of the rocker relative to the body. For the same purpose the rocker can also be connected to the body by two straight sliders. These sliders can in addition have a damping action on the camber movement.

An interesting configuration of the system according to the invention provides that the rocker can be connected to the body in such manner that it can rotate about a point located above the rocker, the wheel support being connected for example to the rocker via transverse arms crossed in a vertical plane.

Alternatively, the wheel support may be connected to the rocker via a Macpherson system.

Preferably, the system according to the invention also comprises control means able to influence the camber of the wheel, for example by acting directly on the camber movement relative to the body so as to influence the camber of the wheel. These control means may comprise a damper and/or an elastically deformable element that opposes the camber movement, such as elastomeric articulations. However, the control means may also comprise an actuator that can be controlled as a function of running parameters of the vehicle.

Preferably, the system according to the invention also comprises an opposed wheel support designed to support an opposite wheel of an axle of the vehicle, the opposed wheel support being connected to the rocker in a configuration symmetrical to that of the wheel support, such that the suspension system guides and suspends both wheels of the same axle.

Preferably, the system of the invention comprises means to control the steering, which connect the wheel support to the rocker. These steering control means may also connect the wheel support to the rocker in such a way that the steering is dependent of the camber movement.

The invention also concerns a vehicle fitted with the system according to the invention. The vehicle may be equipped on the same axle with two systems, the systems being arranged essentially symmetrically relative to the longitudinal axis of the vehicle. These two systems can be interconnected in such manner that the camber movements of each wheel support are coupled. If the suspension system (s) comprise(s) a controllable actuator, this can be controlled as a function of running parameters of the vehicle. The vehicle can also comprise two independent systems on the same axle, each being controlled by an actuator independently of the other.

BRIEF DESCRIPTION OF THE DRAWINGS

Several embodiments of the invention will be described in order to illustrate its characteristics and explain its principles. Naturally, numerous other embodiments of the invention are possible, as suggested by the many variants.

FIGS. 1, 1*a*, 2, 3, 3*a* are schematic illustrations showing the principle and operation of a system according to a first embodiment of the invention, viewed in the longitudinal direction.

FIGS. 4, 5, 5*a*, 5*b*, 5*c* are schematic illustrations showing the principle and operation of a system according to a second embodiment of the invention, viewed in the longitudinal direction.

FIGS. 14, 15, 15*a* are schematic illustrations showing the principle of vehicles according to the invention, viewed in the longitudinal direction.

The figures are not drawn to scale.

DETAILED DESCRIPTION

Figure 1:
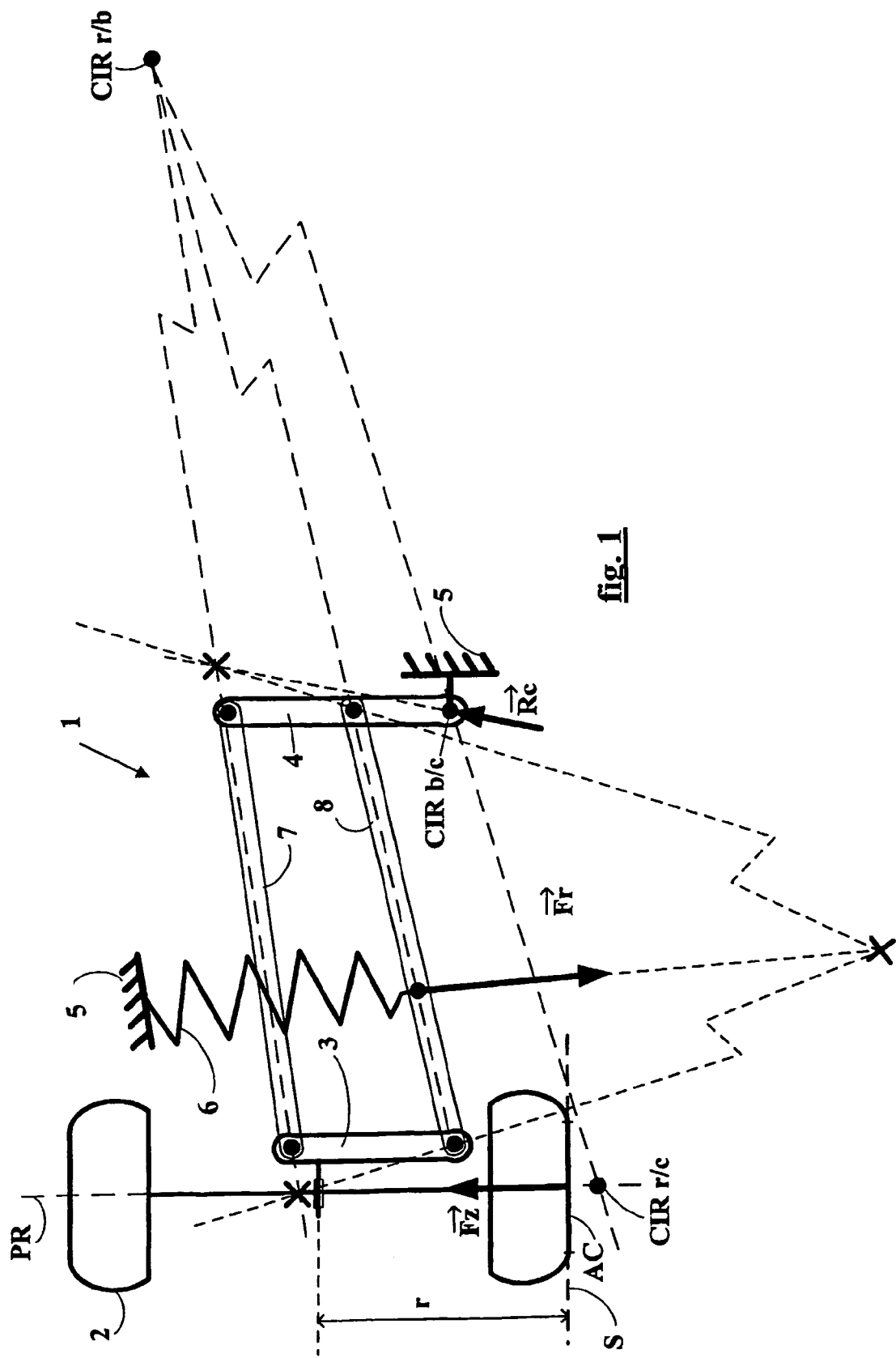

FIG. 1 is a planar longitudinal view of a suspension system 1 according to the invention. This planar (i.e. 2-dimensional) representation is very convenient because it shows clearly the ways in which the system according to the invention differs from systems according to the prior art.

The suspension system 1 comprises a wheel support 3 designed to maintain the plane PR of a wheel 2, upper 7 and lower 8 arms, a rocker 4 and a suspension spring 6. The wheel, of radius "r", is in contact with the ground S via its contact area AC. The upper and lower arms 7, 8 are articulated at their outer ends (relative to the vehicle for which the system is intended) to the wheel support 3 and at their inner ends to the rocker 4. The rocker 4 is articulated to the body 5 of the vehicle (represented schematically). Thus, the suspension system 1 is configured so as to confer on the wheel support, relative to the body 5, a degree of freedom of camber since the wheel support can tilt relative to the body, and a degree of freedom of suspension since the wheel support can undergo essentially vertical movements in a manner known as such, for example in the manner of "multi-arm" systems.

Adopting the classical hypothesis of single-point contact between the wheel 2 and the ground S, theory of colinearity of the instantaneous centers of rotation in a planar movement enables the instantaneous center of rotation of the camber movement (CIR r/c) to be located at the intersection of the wheel plane PR and the line on which the two other instantaneous centers of rotation are located, namely that of the rocker's movement relative to the body (CIR b/c) and that of the wheel support's suspension movement relative to the rocker (CIR r/b). This kinematic reasoning is commonly applied in the field of chassis systems. It will therefore be understood that it is the choice of the configuration, that is to say, the dimensions and orientation of the various elements constituting the suspension systems, which (by defining the positions of the characteristic axes of the suspension elements) makes it possible to obtain a desired position of the instantaneous center of rotation (CIR r/c) of the camber movement. FIG. 1 shows the suspension system in a mean position, which can be defined as the position corresponding to rolling in a straight line over flat ground with the vehicle carrying its normal load.

Among the design constraints of such a system, FIG. 1 shows clearly that the position of the rocker's point of articulation on the body is limited, towards the bottom of the figure, by the proximity of the ground. Thus, as a function of the ground clearance desired for the vehicle, various configurations can be chosen.

FIG. 1 represents the case of a particular configuration in which the force Fr exerted by the spring is inclined towards the inside of the vehicle. In the absence of any transverse force exerted by the ground on the wheel in the contact area (i.e. when the force fz is vertical), equilibrium is obtained when the force Rc exerted by the body on the rocker is as shown, that is to say, slightly inclined towards the inside of the vehicle. This determination may be effected by calculation or by graphical construction. The graphical construction, based on the equilibrium of the various elements of the system, is represented in FIG. 1 by broken lines. It is evident, that the condition of equilibrium can be achieved even if the thrust of the spring is inclined.

FIG. 1a shows an interesting variant compared with the configuration of FIG. 1. In this suspension system 1a, it is sought to obtain a force Rc exerted by the body 5 on the rocker 4a that is also vertical.

The graphical constructions shown in FIGS. 1 and 1a are based on the equilibria of the various elements of the systems 1 and 1a. In the case of FIG. 1a, in which two of the forces (Fz and Rc) are vertical, overall equilibrium of the suspension system necessitates that the third force (Fr) is also vertical.

In FIG. 1a a broken line is used to show the fact that the rocker 4a may also constitute the rocker of the (symmetrical) suspension system of the opposite wheel, as will be described more precisely in connection with FIGS. 15 and 15a.

FIG. 2 shows the suspension system of FIG. 1 in a position in which the camber has undergone a negative variation. The wheel 2 is tilted towards the inside of the vehicle by a rotation about the instantaneous center of rotation of the camber (CIR r/c). It should be noted that the position of that point is not fixed since the position of the instantaneous center of rotation of the suspension (CIR r/b) varies slightly because of the pivoting of the lower 8 and upper 7 arms in this example. Of course, this variability itself is also determined by the geometrical configuration of the system.

Since the instantaneous center of rotation of the camber (CIR r/c) is located under the contact area, the camber variation shown here can be brought about by a transverse force Fy exerted by the ground S on the wheel 2 in the contact area AC. This force Fy, directed towards the inside of the vehicle, may originate in the transverse acceleration caused by a bend or a configuration of the ground S that is inclined relative to the horizontal.

FIG. 3 repeats the example of FIGS. 1 and 2 in the case of a positive camber variation which can be brought about by a transverse force Fy directed towards the outside of the vehicle.

Figure 3A:
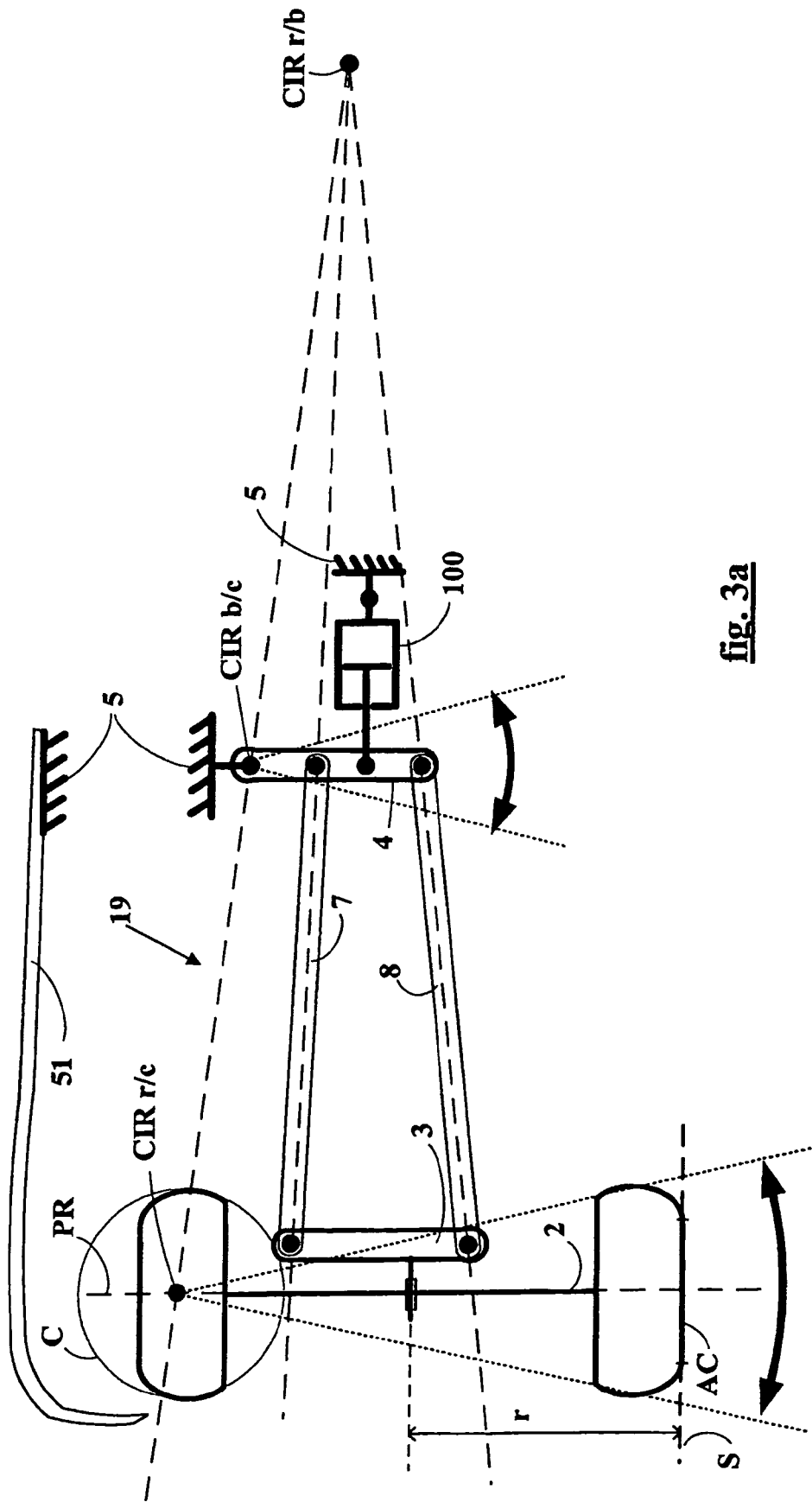

FIG. 3a shows an "active" variant of the system described in FIGS. 1 to 3. In this variant the rocker 4 pivots relative to the body 5 around a point (CIR b/c) located above the articulation points of the lower 8 and upper 7 arms on the rocker 4. The position of the instantaneous center of rotation of the camber (CIR r/c) can be determined for the configuration of FIG. 3a, in accordance with the reasoning explained above. This is of course still in the wheel plane PR but this time at the top of the wheel 2. More precisely, the instantaneous center of rotation (CIR r/c) is preferably essentially at the center of the circle (C) in which the cross-section of the upper part of the wheel is inscribed.

In accordance with the reasoning applied for the previous figures, it is of course found that the forces exerted by the ground S in the contact area AC naturally tend to tilt the wheel 2 in the direction opposite to that which is desirable in terms of camber since the pivot point for the camber movement (CIR r/c) is located above the ground S. That is why this configuration requires the use of active means in order to impose the desired camber. In this case that part is played by a jack 100 which orientates the rocker 4 relative to the body 5 as a function, for example, of running parameters of the vehicle. The curved double-arrows indicate schematically on the one hand the action of the jack 100 on the position of the longitudinal axis of the rocker, and on the other hand the effect of that action on the position of the wheel plane PR. As discussed earlier, this situation has the disadvantage that a relatively large amount of energy is consumed. However, it also has advantages.

One of these advantages concerns the space occupied by such a system. In effect, a so-termed "passive" configuration entails providing a large enough free volume around the upper part of the wheel, i.e. under the wings of the vehicle, to allow the oscillation movements of the wheel plane PR. In contrast, the "active" configuration shown in FIG. 3a allows a vehicle design whose body is very close to the wheels in any camber situation. Here, a wing 51 (attached to the body 5) is shown very close to the wheel 2. Only the vertical deflection of the suspension need then be taken into account in the body design.

Another advantage of this "active" configuration concerns the half-track variation during camber movements. If, in a situation such as turning to the right (as in FIG. 2), the jack 100 imposes a negative camber on the wheel 2 and this movement takes place around a point (CIR r/c) located at the top of the wheel 2, the bottom of the wheel 2 (and hence the contact area AC) is pushed (relative to the body 5) towards the outside of the bend. This corresponds to what is known as a positive half-track variation. This characteristic has the advantage of counteracting the load transfer by a displacement of the center of gravity of the body 5 towards the inside of the bend. Accordingly, the excess load on the outer wheel compared with the wheel on the inside of the bend is reduced. This is a positive factor for the overall grip potential of the axle.

Another advantageous characteristic of the system of the invention (common to all its embodiments) is that the instantaneous center of rotation of the wheel relative to the body (CIR r/c) is a virtual point that does not correspond to a physically actual mechanical articulation at this point. Accordingly, the point can be located anywhere in the wheel plane PR, including (as shown here) within the volume occupied by the wheel or its tire. This would of course be impossible if there were a single, physical pivot.

Figure 4:
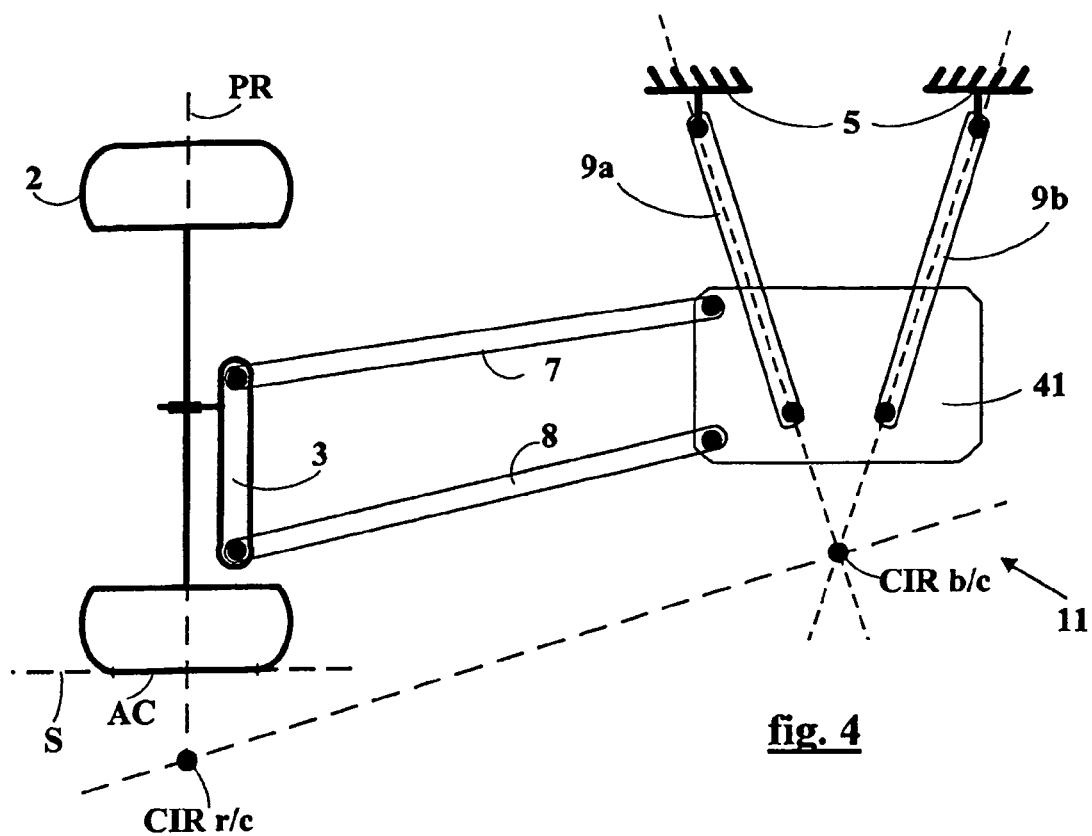
Figure 5:
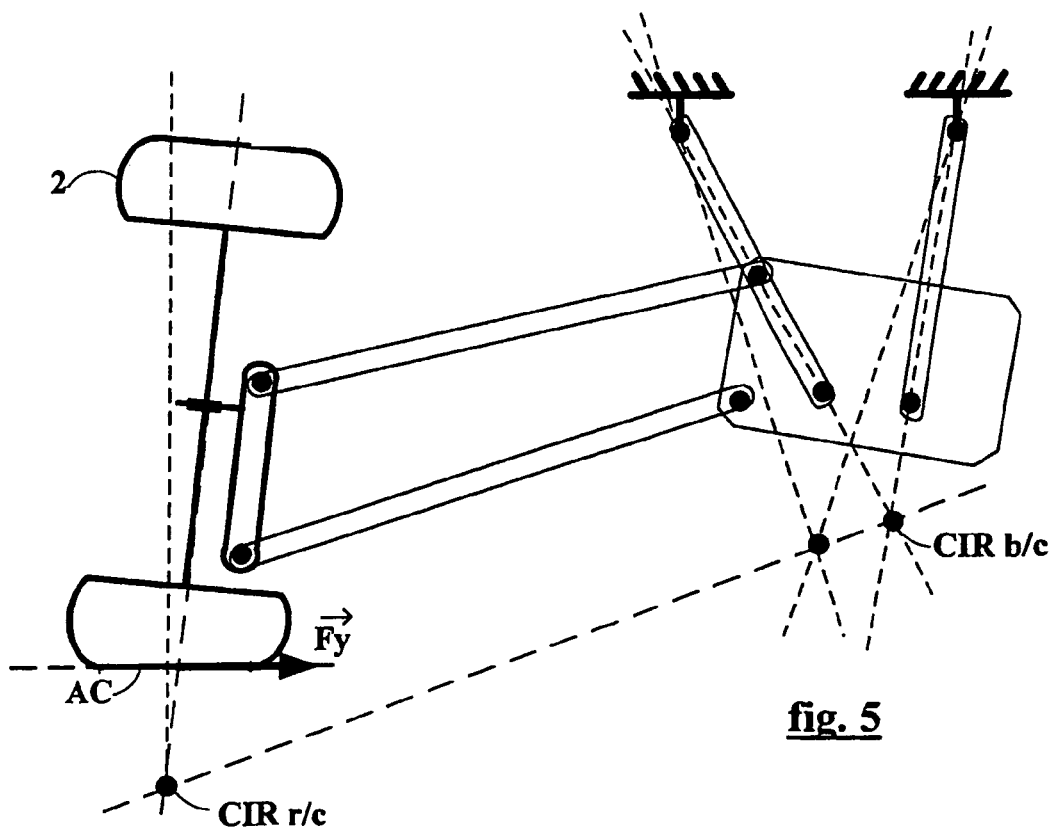

FIG. 4 shows in a manner similar to FIG. 1 a second embodiment of the invention. To enable direct comparison with the first embodiment, the instantaneous centers of rotation (CIR r/b. CIR b/c, CIR r/c) have essentially the same positions. However, this is only an example (as in the case of the first embodiment) and in fact an infinite number of configurations are possible. The difference from FIG. 1 is in the way that the rocker 41 is articulated relative to the body 5. Rotation of the rocker about the instantaneous center of rotation (CIR b/c) is allowed by virtue of a connection by two rods 9a and 9b, themselves articulated to the body so that their respective axes meet, in the mean position shown here, at the instantaneous center of rotation (CIR b/c) of the rocker 41 relative to the body 5. Thus, the rocker 41 is articulated relative to the body by a virtual pivot, i.e. a pivot not materialized by a pivot link about a fixed point as in the previous figures. This has two important consequences: on the one hand, the position of the point is not fixed relative to the body because it moves appreciably during the oscillation of the rocker, and on the other hand its position is not limited relative to the ground as can be the position of the same point in the case of FIG. 1. FIG. 5 shows the same system in a camber position comparable to that of FIG. 2.

To achieve perfect equilibrium of the system when subjected to a vertical force Fz exerted by the ground in the contact area, the system must be configured in such manner that, in the mean position of the wheel, each element of the system is also in equilibrium.

FIGS. 5a and 5b illustrate a way to achieve this equilibrium condition. This configuration, illustrated here on the basis of the example configuration shown in FIG. 4, is based on the hypothesis of a spring producing a vertical thrust Fr on one of the arms, in this case the lower arm 8. The equilibrium of the suspension system is subjected to external forces which are the vertical force Fz exerted by the ground in the contact area, the force Fr exerted by the spring on the arm 8 and the resultant Fb of the forces exerted by the rods 9a and 9b on the rocker. FIG. 5b shows the characteristic dimensions of the system. "E" is the distance, projected on a horizontal line, between the center of the contact area and the articulation point of the wheel support 3 to the arm (8) carrying the spring. "$E^1$" is the distance, projected on a horizontal line, between the instantaneous center of rotation of the rocker relative to the body (CIR b/c) and the articulation point of the arm carrying the spring (8) to the rocker (41). "H" is the distance, in the camber plane, of the articulation point of the wheel support 3 with the arm (8) carrying the spring from the axis of the arm (7) which is not carrying the spring. "$H^1$" is the distance, in the camber plane, of the articulation point of the rocker 41 with the arm (8) carrying the spring from the axis of the arm (7) not carrying the spring. "A" is the distance, in the camber plane, between the center of the contact area and the axis of the spring's thrust Fr. "B" is the distance, in the camber plane, between the instantaneous center of rotation (CIR b/c) and the axis of the spring's thrust Fr. The sum of the distances A and B corresponds to the half-track of the vehicle.

Starting from these hypotheses, the solution of the equilibrium equations of the various elements leads to the following condition: perfect equilibrium is obtained when the ratio $(EBH^1)/(E^1AH)$ is equal to 1. These formulas are based on the hypothesis of frictionless links with no rigidity. In practice, satisfactory operation can be obtained when the system is configured such as to be close to equilibrium, for example when the value of the above ratio is between 0.5 and 1.5. This criterion, of course, applies in a general way and is not limited to the configuration used here to illustrate it. A way of applying the criterion for a given configuration (given half-track, E, $E^1$, H and $H^1$) is, for example, to deduce from it the position of the ideal axis of a vertical thrust Fr (by calculating A and B).

To satisfy perfectly the condition for equilibrium of the system and its elements in the general case when the thrust is not necessarily vertical, the solution of the equilibrium equations has shown that for a given configuration the spring's thrust axis must pass through a single point. This point can be defined as the point of convergence of ideal thrust axes.

To determine this point of convergence, two different ideal axes can be determined and their intersection in the camber plane sought. It has also been found that the point is located at the intersection of any ideal thrust axis and of the line passing through the instantaneous center of rotation (CIR b/c) of the rocker relative to the body and through the point on the rocker at which the arm carrying the spring is pivoted. As explained below, this finding enables the convergence point to be determined simply from the configuration studied.

The graphical determination of the convergence point is illustrated in FIG. 5c with reference to the example configuration of FIG. 5. To determine the point (G), in this case a particular ideal thrust axis has been used. This axis (Drv) is vertical and its position can be determined as a function of the geometrical characteristics of the system. In effect, it has been shown previously that in the case of a vertical thrust the position of the ideal vertical thrust axis satisfies the condition according to which the ratio $(EBH^1)/(E^1AH)$ equals 1 (see FIG. 5b). The line Dcg is the line passing through both the point CIR b/c and the point on the rocker 41 at which the arm carrying the spring (here, the lower arm 8) is pivoted. The line Drv cuts the line Dcg at G. This point G is the single point (for a given configuration) through which the thrust axis must pass to ensure perfect equilibrium. The point G is the convergence point of the ideal thrust axes. Four examples have been shown (Ar1, Ar2, Ar3, Ar4) of ideal thrust axes which satisfy the equilibrium conditions for the mean position of the wheel. In practice the implantation of a spring may take several forms, the pertinent criterion being the axis (Ar1, Ar2, Ar3, Ar4) of the thrust that it exerts.

During operation of the suspension system, the thrust axis of the spring may vary due to displacement of the various elements. The thrust axis may then move away from the point G (which is determined in the mean position) and the equilibrium may move away from perfect equilibrium.

Besides its variation during the operation of the system, it is also possible for the thrust axis, in the mean position, to be distant from the convergence point for example because of manufacturing tolerances and/or design compromises such as the rigidity of the articulations. Preferably, however, the transverse force exerted by the ground on the wheel in the contact area generated during large suspension deflections will not exceed a limit corresponding to 0.3 P, "P" being the axle load. A way to satisfy this condition is to ensure that the distance, in the camber plane, from point G to the spring's thrust axis during large deflections does not exceed 20% of the half-track, where the half-track is A+B. It is also preferable for the transverse force exerted by the ground on the wheel in the contact area generated during small suspension deflections not to exceed a limit corresponding to 0.1 P. A way to satisfy this condition is to guarantee that the distance, in the camber plane, of point G from the spring's thrust axis, in the mean position, does not exceed 13% of the half-track.

A first circle Cd (whose radius corresponds to 20% of the half-track) centerd on the convergence point G represents schematically the zone that must be intersected by the thrust axis during large deflections to satisfy the first distance criterion stated.

A second circle Cs (whose radius corresponds to 13% of the half-track) represents schematically the zone that must be intersected by the thrust axis, in the mean position, to satisfy the second distance criterion stated.

The example shown in FIG. 5c is a particular configuration but it will be easily understood that the convergence point (G) can be determined in like manner for any configuration of the system according to the invention, and that the equilibrium criteria associated with this reasoning are also applicable.

The terms "ideal thrust axis" or "axis of ideal thrust" mean any spring thrust axis such that the system will be in perfect equilibrium in the wheel's mean position in the absence of any transverse force exerted by the ground in the contact area. The wheel's mean position can be defined as the design position, i.e. the position of the wheel relative to the body when each wheel is carrying its nominal load and the orientation of the wheel plane corresponds to rolling in a straight line.

The term "large deflections" means essentially vertical deflections of the suspension on either side of the wheel's mean position, amounting to up to 80% of the deflection allowed by the suspension system, while "small deflections" means essentially vertical suspension deflections either side of the mean position, which are limited to 20% of the deflection allowed by the suspension system.

"Configuration" means the combination of geometrical characteristics of the suspension system, as determined with the wheel in its mean position.

Figure 6:
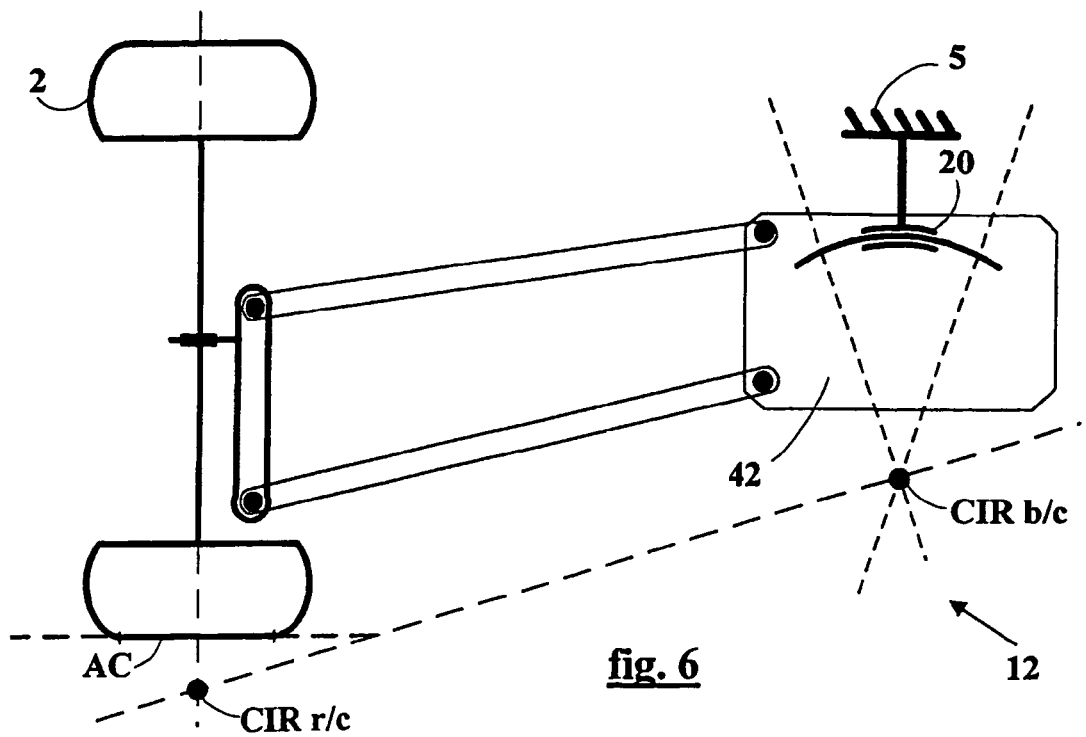
FIGS. 6, 7, 8, 9 are schematic illustrations showing the principle of variants of the second embodiment of the invention, viewed in the longitudinal direction.

FIG. 6 shows another way of connecting the rocker. In this system 12 the articulation of the rocker 42 relative to the body 5 about the instantaneous center of rotation CIR b/c is obtained by a curved slide-bar 20 in the form of an arc of a circle whose center corresponds to the desired CIR b/c point.

Figure 7:
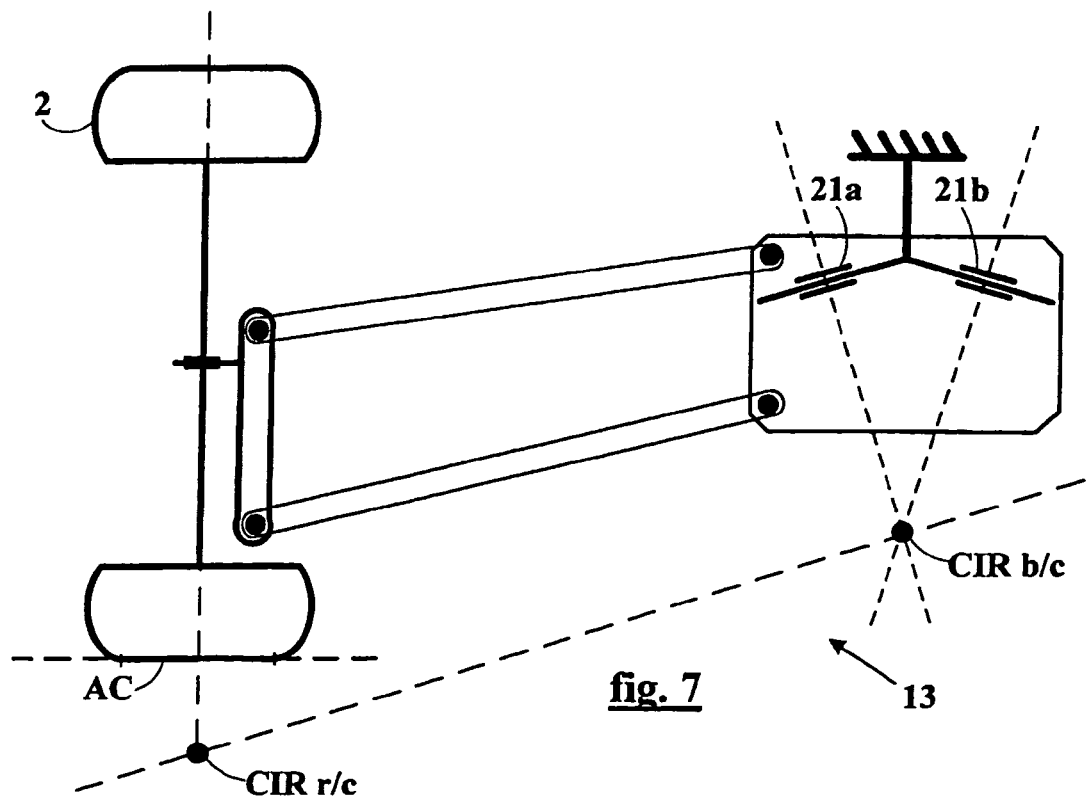

FIG. 7 shows a method of articulating the rocker by two straight slide-bars (9a, 9b) positioned so that the lines normal to the axes of the slide-bars cross at the desired CIR b/c point. The slide-bars (9a, 9b) of this system 13, like that of FIG. 6, may assume various forms in practice. One can of course consider bearings or smooth mechanical systems or one with ball bearings, but the articulations may also be elastomeric, for example cylindrical ones stressed axially.

Figure 8:
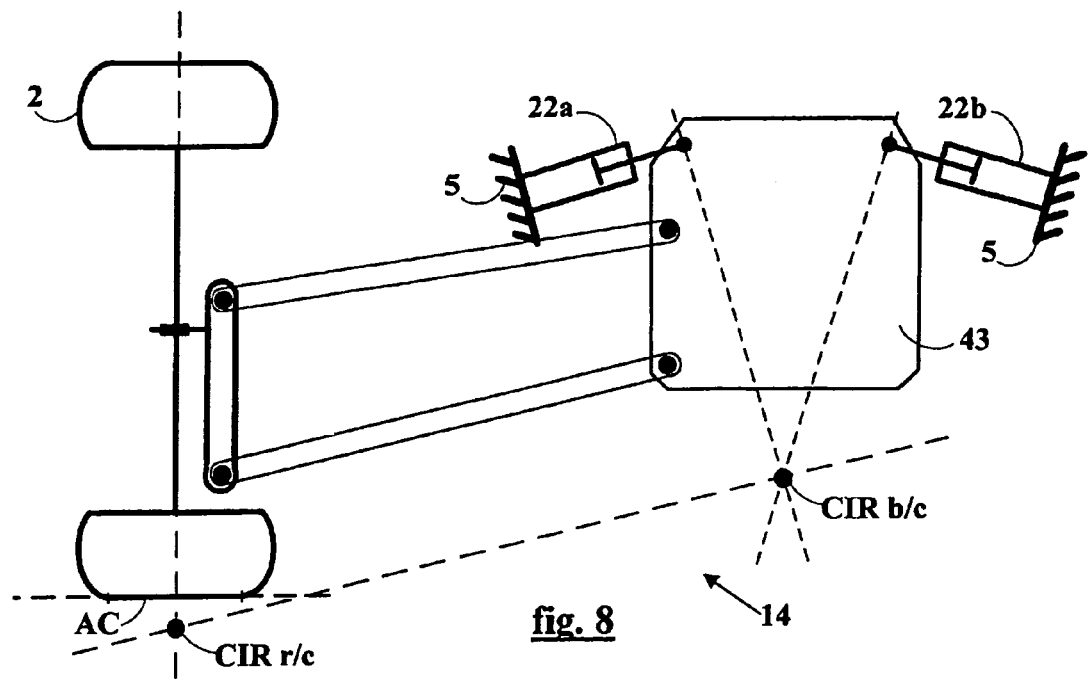

FIG. 8 shows a way to articulate the rocker with two straight slide-bars forming an angle such that the lines normal to the slide-bar axes cross at the desired CIR b/c point. In this case the slide-bars are in the form of telescopic dampers (22a, 22b) rigidly connected at one end to the body 5 and articulated to the rocker 43 at the other end. An advantage of this configuration is that it combines the function of rocker articulation and possible damping of the rolling and camber movements.

Figure 9:
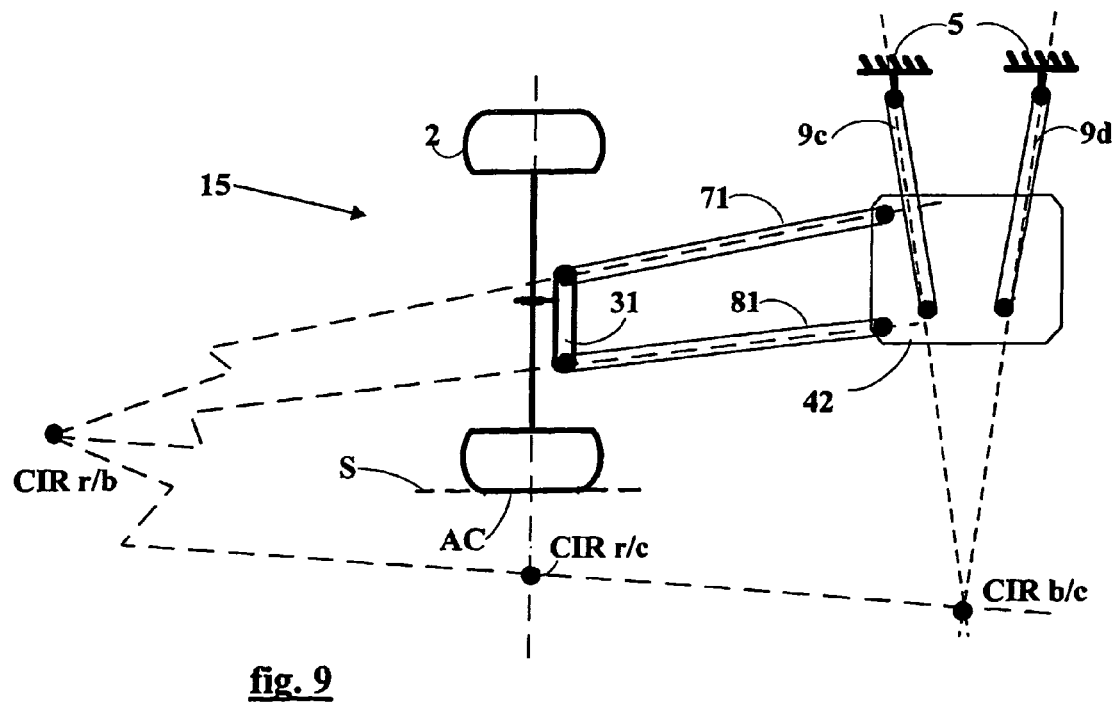

FIG. 9 shows an embodiment similar to that of FIGS. 4 and 5, but with the instantaneous center of rotation (CIR r/c) of the camber obtained by a different configuration. In effect, in this configuration the upper 71 and lower 81 arms converge towards a point (CIR r/b) lower down (and this time located towards the outside of the vehicle), and the pivot point of the rocker 41 relative to the body 5 (i.e. the instantaneous center of rotation CIR b/c) must also be located lower down. In the example shown, this point is below the ground S, i.e. it can only be a virtual pivot. Accordingly, this configuration of the instantaneous centers of rotation cannot be realised with the system described in FIGS. 1 to 3.

Figure 10:
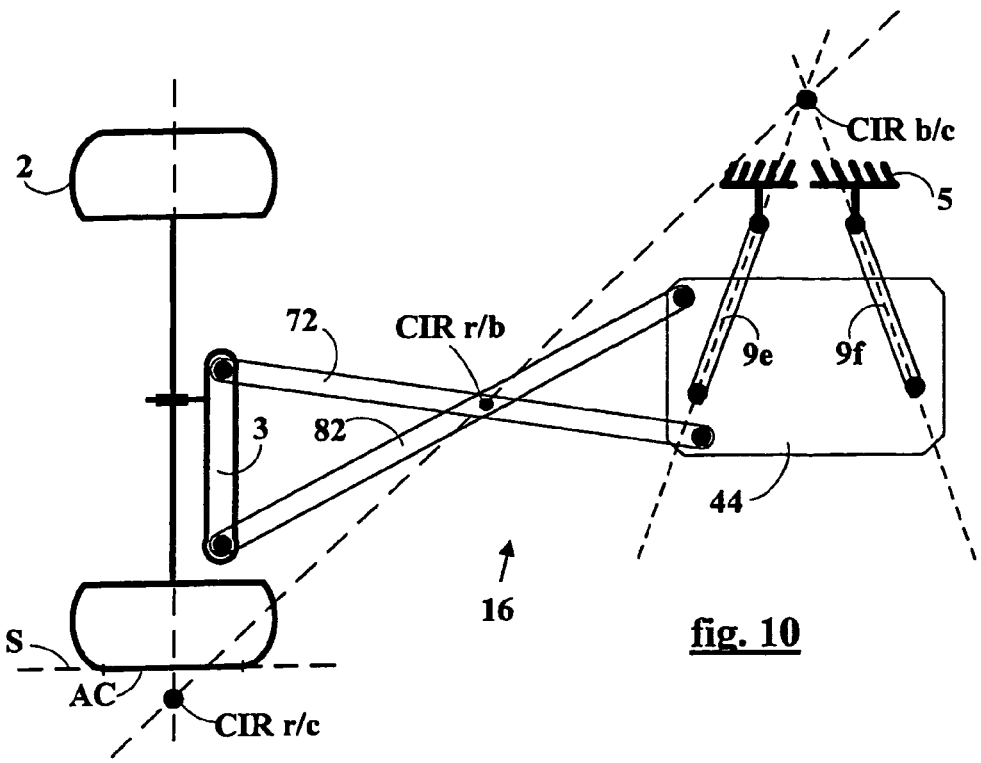
FIGS. 10, 11 are schematic illustrations showing the principle of systems according to other embodiments of the invention, viewed in the longitudinal direction.

FIG. 10 represents an embodiment which is very different from those described earlier, in that the desired position of the instantaneous center of rotation (CIR r/c) of the camber is obtained by combining an instantaneous center of rotation (CIR b/c) of the rocker 44 relative to the body 5 located high up, and an instantaneous center of rotation (CIR r/b) of the wheel support relative to the rocker located at the point where the transverse arms 72 and 82 cross. The orientation of the rods (9e, 9f) is therefore inverted compared to the configurations described earlier, to allow such a position of the point CIR b/c. Naturally, this is only one example embodiment and the articulation means of the rocker 45 could well have the form shown in FIG. 1, provided that the pivoting takes place at the desired height relative to the body 5. One advantage of this configuration is that the rolling center of such a suspension system is appreciably higher than in the configurations described previously. This effect can be interesting, for example in vehicles whose center of gravity is relatively high, such as MPVs or SUVs ("sport utility vehicles").

Figure 11:
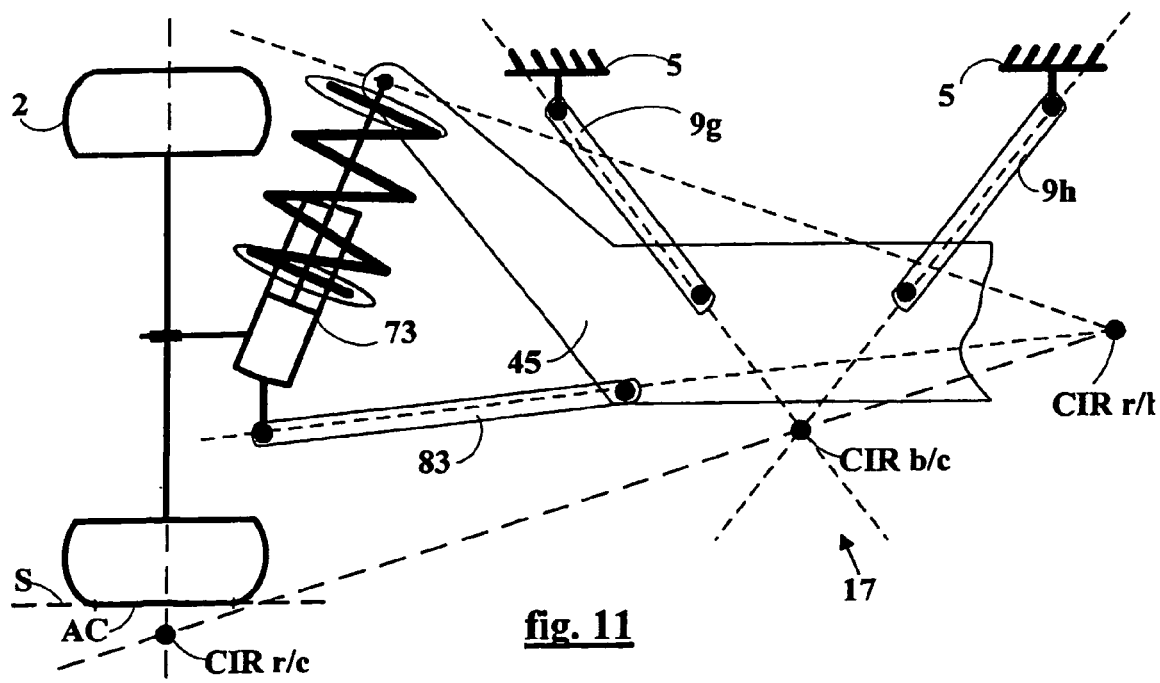

FIG. 11 shows an embodiment which is very different from those described earlier, in that it uses a Macpherson suspension structure (73, 83) articulated to a rocker 45 whose function is the same as before. The desired position of the instantaneous center of rotation (CIR r/c) of the camber is then obtained by the combination of an instantaneous center of rotation (CIR b/c) of the rocker relative to the body 5 and an instantaneous center of rotation of the wheel support relative to the rocker (CIR r/b) located at the point where the axis of the lower arm 82 crosses the normal to the axis of the Macpherson force strut 73. The implantation of the rods (9g, 9h) is comparable to that in the embodiments described previously. Naturally, as with most of the examples described here, the link of the rocker to the body can be a mobile virtual pivot (as in FIG. 11) or a fixed, material pivot as in FIGS. 1 to 3 or a fixed virtual one as in FIG. 6.

Figure 12:
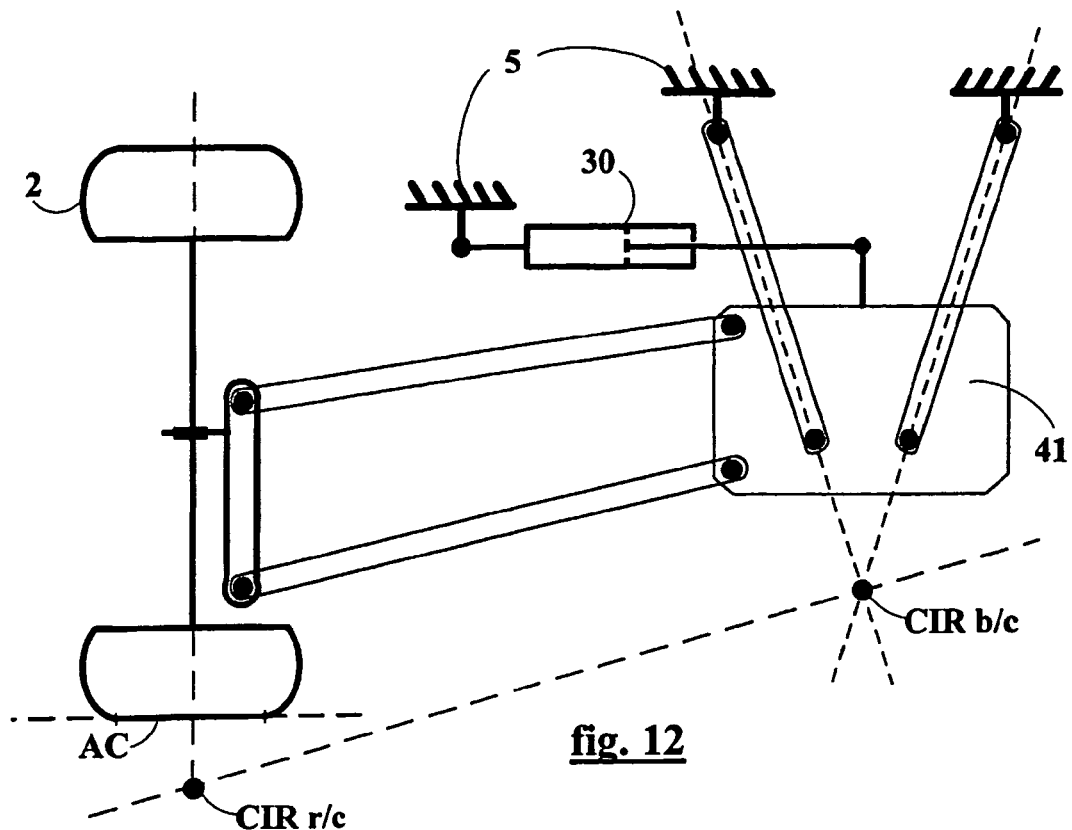
FIGS. 12, 13, 13*a* are schematic illustrations showing the principle of control means applied to the systems according to the invention, viewed in the longitudinal direction.

FIG. 12 shows a structure similar to those of FIGS. 4 and 5, to which have been added means for controlling the camber, in this case passive control means in the form of a telescopic damper 30 that can damp the oscillations of the rocker 41 relative to the body 5.

Figure 13:
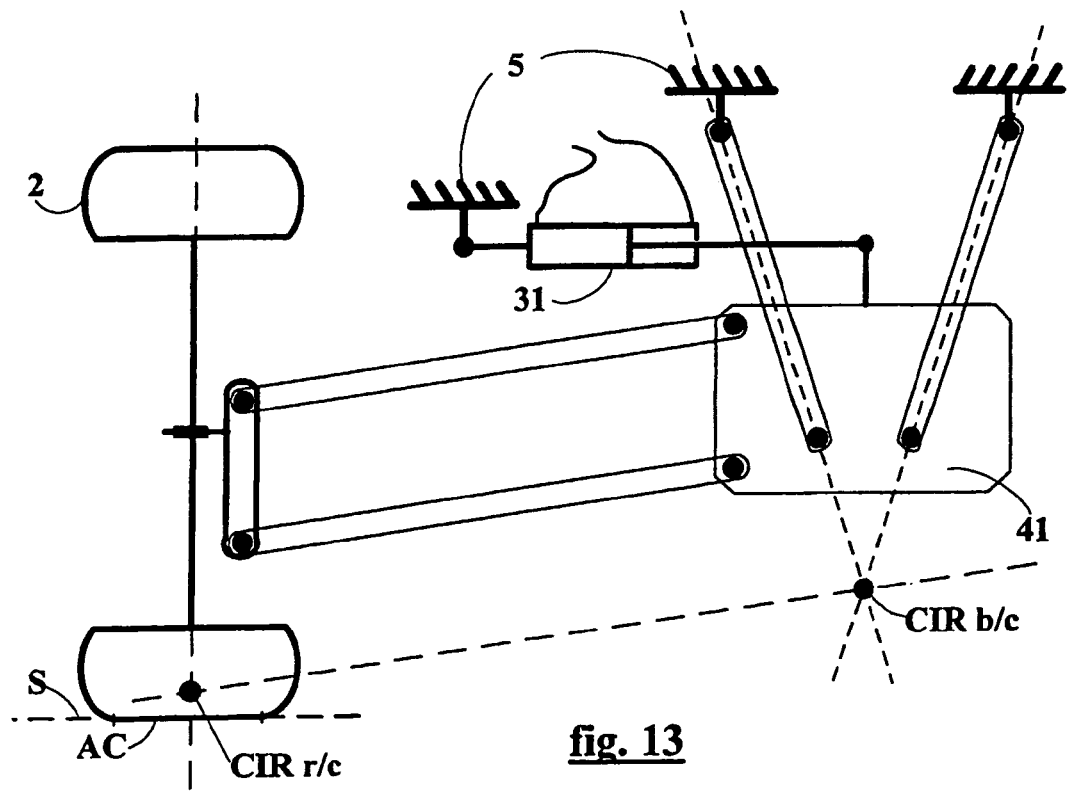

FIG. 13 shows a structure close to that of FIG. 12, in which the control means can be piloted. There may for example be a hydraulic jack 31 or an electric motor. This may play the part of an actuator which supplies energy to bring about a desired camber variation. In this case of active control, it is advantageous for the instantaneous center of rotation (CIR r/c) of the camber's degree of freedom to be located at the level of the ground S or above, but at a smaller distance in order to enable control with low energy input. This is the configuration shown in FIG. 13.

In contrast, the control means may have a passive role in regulating the camber movements brought about, for example, by transverse forces as illustrated in FIGS. 2 and 3.

Whether the control means be passive or active, if they are pilotable they may be regulated as a function of various running parameters of the vehicle (such as speed, longitudinal or transverse acceleration, steering wheel position, rotation speed of the steering wheel, torque exerted on the steering wheel, roll, roll speed, rolling acceleration, yaw speed, yaw acceleration, forces on the wheels including the vertical load, type of driving, handling desired by the driver).

According to a similar design, the control means may comprise means for measuring the camber movements. In the case of camber movements induced by transverse forces this measurement enables the forces to be determined by methods known as such. This information is useful for example for the piloting of safety systems or systems for correcting the handling of the vehicle.

Figure 13A:
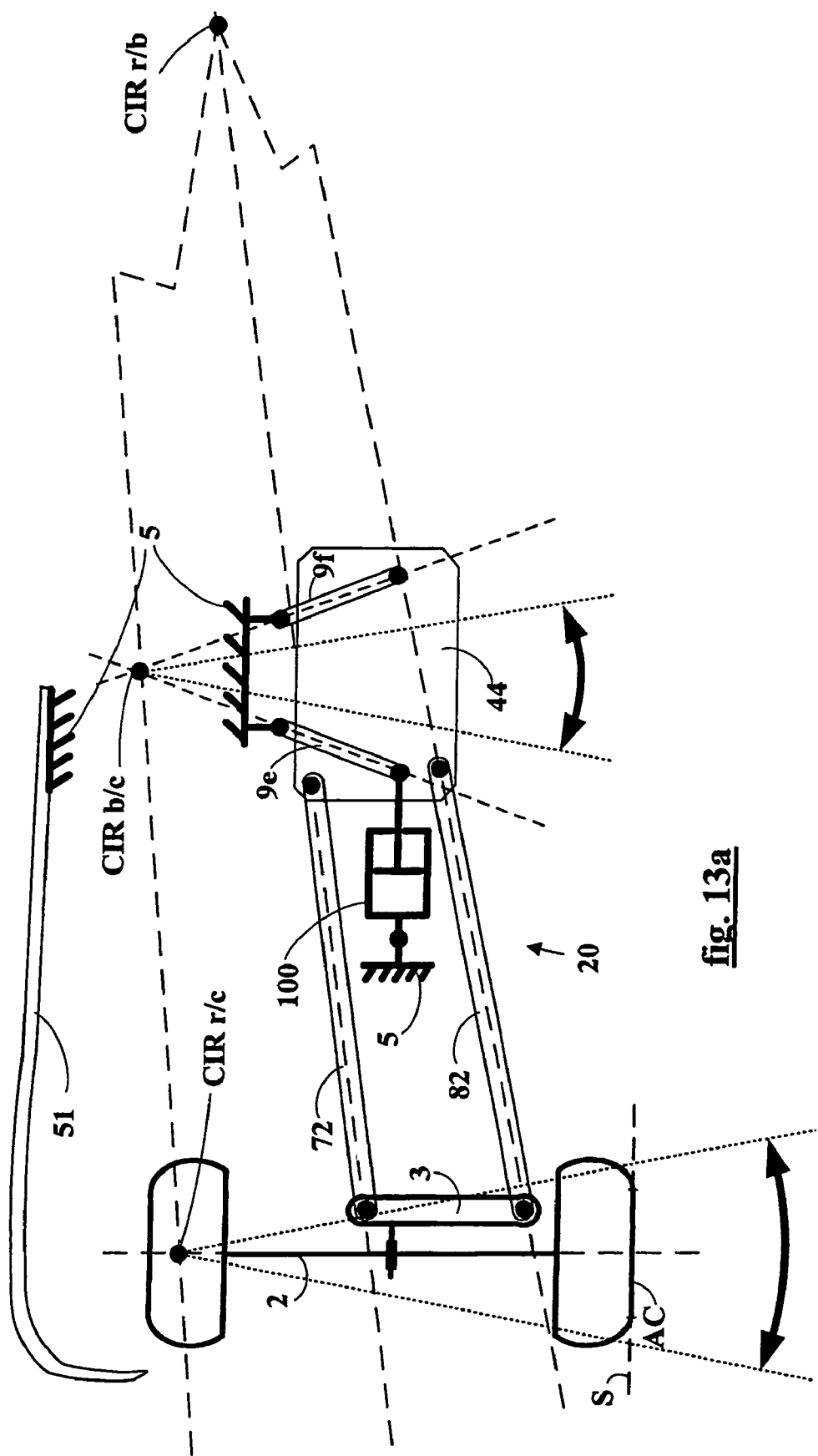

FIG. 13a shows an "active" variant of the device described in FIG. 10. In this variant the rocker 44 also pivots relative to the body 5 around a point (CIR b/c) defined by the orientation of the rods 9e and 9f. On the other hand, the upper 72 and lower 82 arms are in a classical configuration, i.e. they are not crossed as in FIG. 10. Following the reasoning explained earlier, for the configuration of FIG. 13a the position of the instantaneous camber center (CIR r/c) can be determined. This is still in the wheel plane but now at the top of the wheel 2, essentially as in FIG. 1a.

The operation, advantages and drawbacks of such a configuration are essentially the same as those of the FIG. 1a configuration. However, owing to the different way in which the rocker 44 is articulated relative to the body 5, one can for example choose a relatively high position of the articulation point (CIR b/c) of the rocker. In effect, since the point is in this case virtual, its height position does not necessarily entail greater vertical space allowance.

The position of the instantaneous center of rotation (CIR r/c) at a height slightly less than twice the radius "r" of the wheel from the ground, for example at about 1.8 r, is a preferred position from the standpoint of the criterion of space occupied under the wing 51 of the vehicle. Clearly, the greater this height, the more power will be needed for the control of the camber. A compromise may be achieved between these two tendencies by choosing a height intermediate between low-energy configurations such as that of FIG. 13 and low-space ones such as those of FIGS. 1a and 13a.

Figure 14:
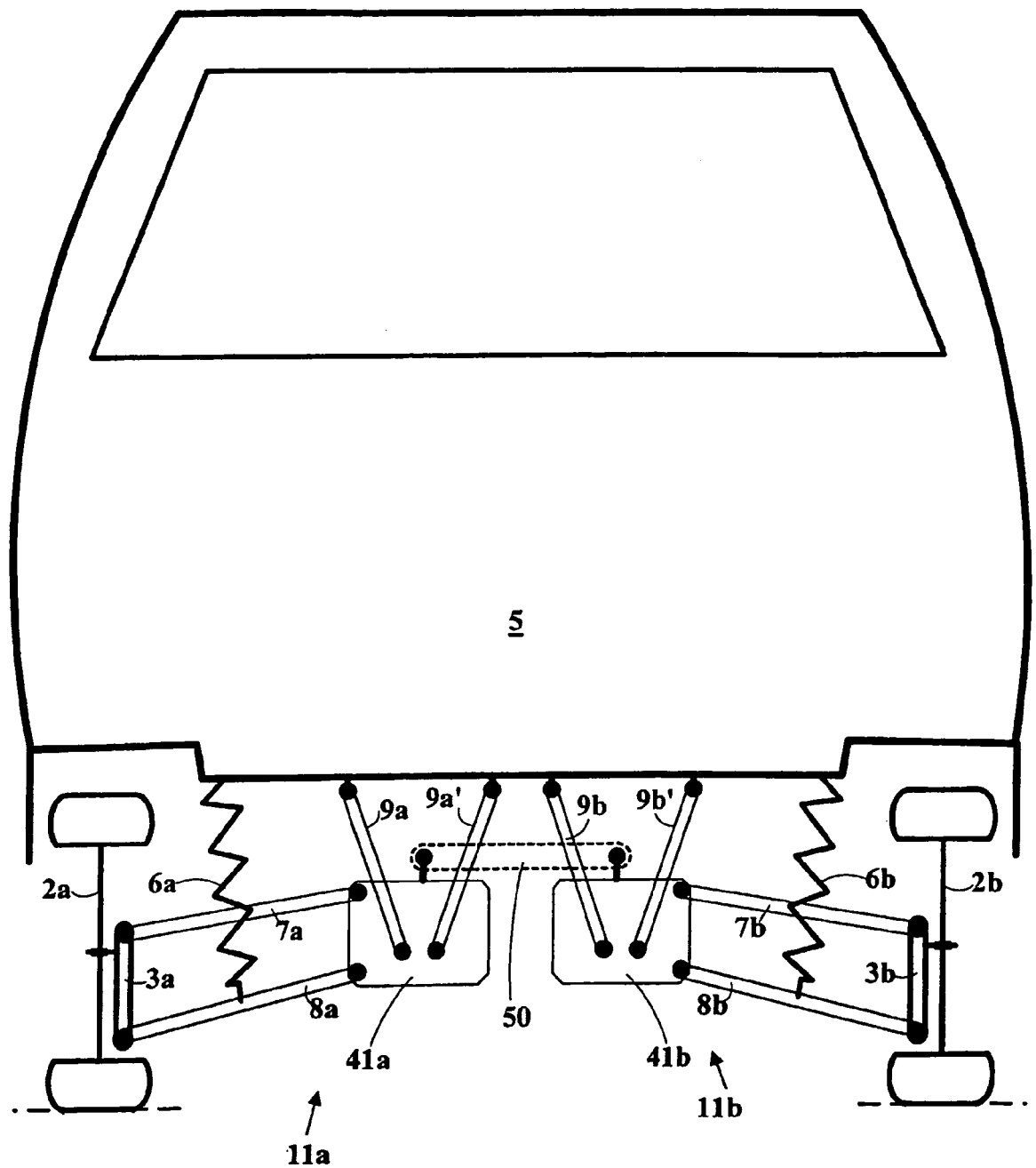

FIG. 14 shows a vehicle according to the invention. It is fitted with two suspension systems (11a and 11b) according to the invention, arranged essentially symmetrically relative to the longitudinal axis of the vehicle. The systems shown here are ones described earlier (FIGS. 4 and 5). They may of course be independent of one another, or alternatively linked by coupling means such as a push-rod 50 (indicated by broken lines). In this way the behaviours of the wheels (2a, 2b) at least in terms of camber are coupled. Such coupling can make it easier to satisfy the conditions for the vehicle's equilibrium. If the two systems are independent, they can be independently controlled. If this independent control is active, it can be regulated in a different way for each wheel. For example, only the camber of the wheel on the outside of a bend could be modified.

FIG. 14 shows rockers (41a, 41b) which are relatively close together, but this is a particular configuration and each rocker could be closer to its respective wheel.

Alternatively, in a similar design, and for example to make the transverse arms (7a, 8a, 7b, 8b) longer, the rockers 41a and 41b can be in slightly different planes along the axis of the vehicle, with the arms guiding the left-hand wheel 2a articulated to the right-hand rocker 41b and vice-versa.

Figure 15:
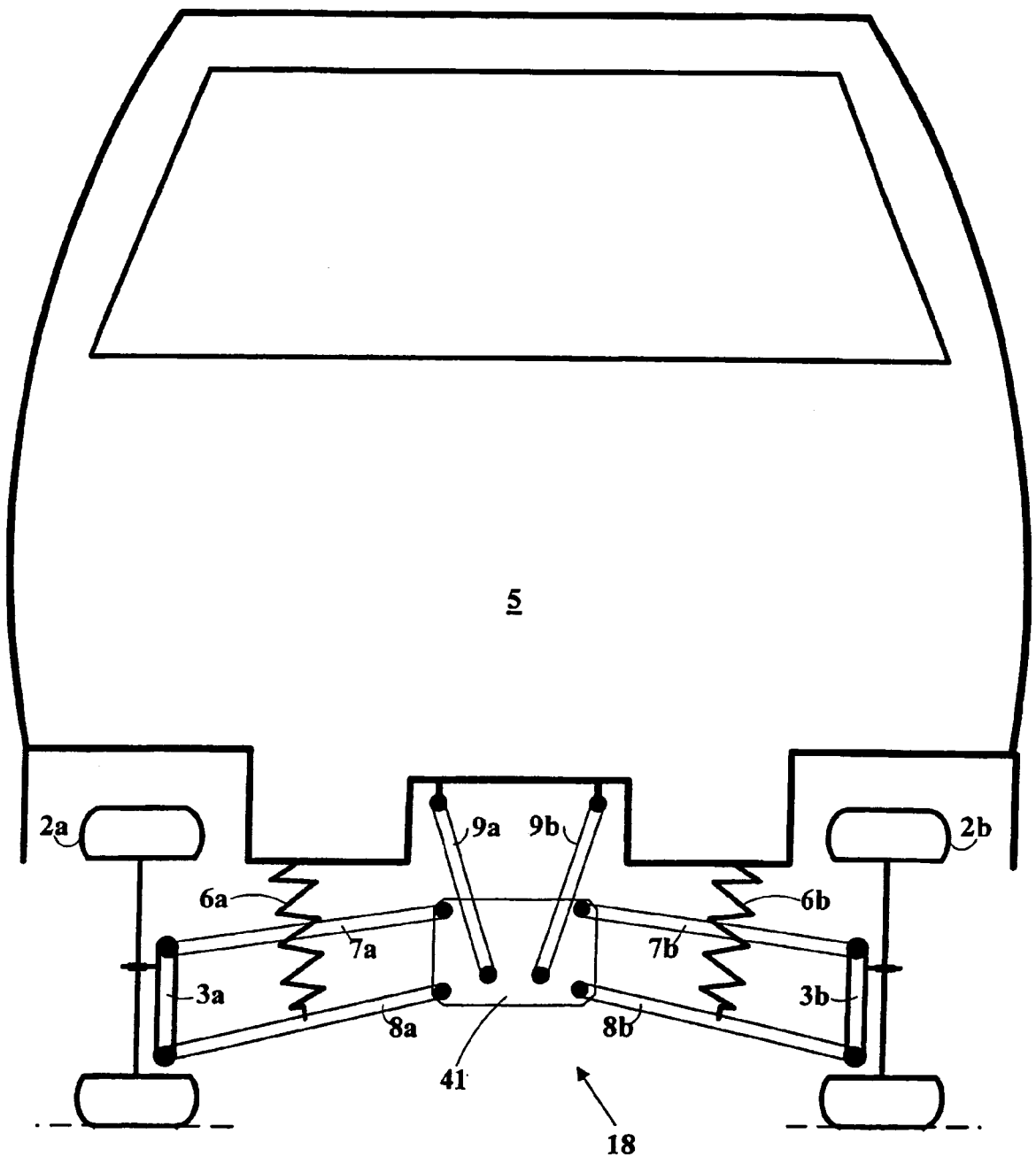

FIG. 15 shows another vehicle according to the invention. It is equipped with a preferred embodiment of the suspension system 18 according to the invention. This system, which is comparable to those described earlier, comprises in addition an opposed wheel support 3b designed to carry an opposed wheel 2b of an axle supporting the body 5 of the vehicle. The opposed wheel support 3b is connected to the rocker 41 in a configuration symmetrical to that of the wheel support 3a. An advantage of this embodiment is of course that it has fewer parts than the one shown in FIG. 14. This generally has a direct impact on cost. Another advantage is that the coupling effect described as an option in FIG. 14 is in this case total. A limitation of this embodiment of the vehicle according to the invention (still referring to FIG. 14) can be that implantation under the vehicle is more restricted in terms of available space. A particular realisation is illustrated here, but of course any embodiment of the invention (whether or not illustrated earlier) can constitute such a single axle.

FIG. 15a illustrates an "active" variant of a suspension system and vehicle according to the invention. This configuration repeats most of the elements in FIG. 15. The essential differences are as follows: on the one hand, the rocker 46 is articulated relative to the body 5 about a point (CIR b/c) located in an intermediate position almost at the center of the rocker, and on the other hand the orientation of the rocker relative to the body is controlled actively by a jack 100.

In line with the reasoning explained earlier, it is for example possible to determine for this configuration the position of the instantaneous center of camber (CIR ra/c) of the wheel 2a on the left. This is still in the wheel plane but now in an intermediate position corresponding essentially to the height of the axis of the wheel 2a. The same reasoning applies of course for the right-hand wheel 2b, but the geometrical construction has not been shown. This compromise configuration (similar to that evoked in the description of FIG. 13a) has some advantage so far as the transmission of drive power to the wheels is concerned. In effect, since the camber movement of the wheels relative to the body takes place about a point located at the level of the center of the wheel, the distance between the center of the wheel and a fixed point on the body is unaffected by the camber movements. Thus, a transmission of the type currently found in commercial vehicles can be used provided that the joint on the wheel side can accept an angular deflection slightly greater than normal due to the camber. On the other hand, it may be necessary to provide transmissions that also allow a larger variation of their length in the other geometrical configurations described earlier.

It is clear that the configurations described combine both geometrical and technological characteristics. A very large number of combinations have not been explicitly described, but it will be clear to a person with knowledge of suspension systems that the elements described, and other elements not described but already known as such, can be associated in different ways. The purpose of the figures was to illustrate the principles that characterise the invention.

As has been seen, as a function of the operation desired a position can be chosen for the instantaneous center of rotation (CIR r/c) of the camber movement within a range from 2.5 r above ground to r below ground (where r is the radius of the wheel). The fact that this point is positioned near ground level enables the half-track variation to be limited. For example, in the case of an instantaneous center of rotation located a distance r from the ground and when the wheel has radius 300 mm, a 5° camber displaces the contact area relative to the body (i.e. varies the half-track) by about 25 mm. It has been found that this value must be regarded as a limit not to be exceeded. In effect, in contrast to what was explained for FIG. 1a earlier, this half-track variation tends to increase the load transfer towards the outside of the bend. However, when the instantaneous center of rotation of the camber degree of freedom (CIR r/c) is above ground level, in which case the system of the invention must comprise an actuator to orientate the wheel plane actively (see FIG. 13), experiments have shown that beyond a certain height the power required for this active operation results in very high energy consumption by the system. This height limit has been found to correspond essentially to half the wheel radius when the criterion of space occupied under the wings is disregarded.

The various examples in the figures illustrate the fact that the suspension system of the invention can be made in accordance with very different suspension principles provided that the desired kinematic definition is obtained. In particular, the rockers shown in arbitrary shapes can take any suitable form that enables the articulation axes to be positioned appropriately and, of course, to support the suspension stresses. The same applies to the other constitutive elements such as the transverse arms.

The camber plane can be defined as the plane orthogonal to the ground, transverse to the vehicle, and passing through the point of application of the resultant of the forces within the contact area. The figures depict the principles and several embodiments of the invention with reference to this plane. This two dimensional representation is advantageous for the clear illustration of the essential characteristics of the system of the invention, whose objective is a controlled variation of the camber. In this representation, the camber movement is a rotation in the plane about a pivot point (instantaneous center of rotation). It should not be forgotten, however, that in reality a rotation takes place (in three dimensions) about a real or virtual pivot axis (instantaneous axis of rotation). This axis is represented by a point in the planar representation. The axis can be constructed essentially parallel to the ground plane and to the longitudinal axis of the vehicle, to allow the camber variations envisaged. However, by varying the orientation of this axis, additional steering, toe-in, toe-out or spin angle effects can be produced as a function of the transverse (bend) and longitudinal (braking, acceleration) forces undergone by the wheel in the contact area. Those familiar with the subject will know how to conduct tests and/or apply theoretical methods to determine the orientation best adopted as a function of the behaviour expected from the system. For example, experiments have shown that an inclination of the pivot axis of 6° relative to the horizontal allows camber-related steering at an angle 10 times smaller than the camber angle. Thus, when the transverse forces induce a camber of 5°, the deviation is about 0.5°. The inclination of the pivot axis can be obtained for example by equipping the vehicle with a system inclined at 6° off the vertical.

The figures do not show all the necessary but nevertheless known elements of suspension systems. In particular, those with knowledge of the field will know how to guarantee the longitudinal positioning of the wheel plane, for example by means of a longitudinal arm or by guiding the rocker and connecting the rocker to the wheel support by a wishbone or A-arm. Similarly, the holding of the wheel plane in its steering direction is ensured either by an element connected to the steering system or by an element of fixed dimension such as a toe rod for a non-steering axle. However, a preferred embodiment of the system of the invention provides that these steering control elements connect the wheel support directly to the rocker so that the steering can be controlled without undergoing unpleasant perturbations because of the sizeable camber variations made possible by the system according to the invention. Preferably, this connection of the rocker to the wheel support can be used to induce a steering effect as a function of the camber, since the movements of the rocker are directly coupled to the camber. Thus, when camber is controlled by the transverse forces (in the case when the system of the invention functions passively), the steering can be induced by the transverse forces. The effect is then the same as that of the pivot axis inclination described earlier.

As described earlier, the figures show a planar (i.e. two-dimensional) representation in the camber plane. This representation gives a clear view of theoretical operation of the systems according to the invention in camber and track variation. In practice, i.e. in three dimensions, systems according to this technical principle can be made by extrapolating their characteristics faithfully from two-dimensional representations. However, the technical principle can also be applied to systems whose projection on the camber plane is different but whose kinematics in the camber plane are the same as described here in two dimensions. For example, such a system can comprise a lower triangle, an upper triangle and a toe-in rod. The transcription of this system's operation in the camber plane comes from the determination of an equivalent configuration in two dimensions. It can be the outcome of an experimental or theoretical study of the wheel movements around the mean position in the camber plane, from which the equivalent configuration can be deduced.

The various elements of the suspension system according to the invention can be articulated in various ways. The elastomeric articulations currently used in the context of chassis systems make it simpler to obtain equilibrium of the system, because they introduce rigidities. On the other hand, it is known that they favour the comfort of the vehicle.

The system according to the invention can be implemented in order to compensate the deformations of the ground contact system in current vehicles and to enable better performances. In other words, the system of the invention can be used to ensure that the wheel plane will in all circumstances remain essentially orthogonal to the ground plane or slightly inclined thereto, in order to allow also for any deformation of the tire. This objective is generally achieved by a system of the invention whose useful camber amplitude is only a few degrees. However, the system of the invention can also be used to enable a much larger camber variation, i.e. to allow the chassis system to operate more nearly like that of a motorcycle than that of vehicles with three or more wheels currently on the market.

In a general way the figures represent a wheel (2) comprising a pneumatic tire, but the invention of course is relevant to any type of wheel, with or without an elastic tire, whether pneumatic or not, an essential characteristic being the position of the instantaneous center of rotation relative to the contact area, whatever that may be.

The invention claimed is:

1. Suspension system connecting a wheel support to a body of a vehicle, the wheel support being designed to carry a wheel of radius r, the wheel being intended to rest on the ground via a contact area, the system arranged to confer upon the wheel support, relative to the body, a degree of freedom of camber and a degree of freedom of deflection of the suspension which are independent of one another, the system comprising a rocker connected to the body in a manner enabling said degree of freedom of the camber, said rocker connected directly to respective first ends of upper and lower arms which respective second ends are pivotably connected to the wheel support, wherein the system is configured in such manner that the camber movement of the wheel support relative to the body has, around a mean position, an instantaneous center of rotation located within a range from 0.3 r above ground to 0.5 r below ground.

2. System according to claim 1, wherein the instantaneous center of rotation is located in a range from 0.2 r above ground to 0.4 r below ground.

3. System according to claim 2, wherein the instantaneous center of rotation is located in a range from 0.1 r above ground to 0.3 r below ground.

4. System according to claim 1, configured such that the system is close to equilibrium in the mean position when no transverse force is exerted by the ground on the wheel in the contact area.

5. System according to claim 4, configured such that in the absence of camber variations the transverse force exerted by the ground on the wheel in the contact area generated during large suspension deflections does not exceed a limit corresponding to 0.3 P, wherein P is the axle load.

6. System according to claim 1, wherein the instantaneous center of rotation is located below ground level so that the transverse forces exerted by the ground on the wheel in the contact area induce an inclination of the wheel support relative to the body in the direction of reduced camber when the transverse forces are directed towards the inside of the vehicle, and in the direction of increased camber when the transverse forces are directed towards the outside of the vehicle.

7. System according to claim 5, comprising means for measuring the displacement of the rocker in order to deduce from this the transverse forces.

8. System according to claim 1, comprising means for measuring the couple exerted on the rocker in order to deduce from this the transverse forces undergone by the wheel.

9. System according to claim 1, wherein the upper and lower arms are articulated via at least one elastomeric articulation.

10. System according to claim 1, wherein the rocker is connected to the body by a curved slide-bar so configured as to allow the camber movement of the wheel support by virtue of an instantaneous rotation movement of the rocker relative to the body.

11. System according to claim 1, wherein the rocker is connected to the body by two straight slide-bars so as to allow the camber movement of the wheel support by virtue of an instantaneous rotation movement of the rocker relative to the body.

12. System according to claim 1, wherein the rocker is connected to the body so that it can rotate about a point located above the rocker.

13. System according to claim 1, wherein the wheel support constitutes a first wheel support, and further including an opposed second wheel support designed to carry an opposed wheel of an axle of the vehicle, the second wheel support being connected to the rocker in accordance with a configuration symmetrical to that of the first wheel support, including the direct connection of upper and lower arms to the rocker.

14. Vehicle equipped with the system according to claim 1.

15. System according to claim 1 wherein the respective second ends of the upper and lower arms are directly connected to the wheel support.

16. Suspension system connecting a wheel support to a body of a vehicle, the wheel support being designed to carry a wheel of radius "r", the wheel being intended to rest on the ground via a contact area, the system comprising:
 means that confer upon the wheel support, relative to the body, a degree of freedom of camber and a degree of freedom of deflection of the suspension which are independent of one another,
 a rocker connected on the one hand to the body and on the other hand to the wheel support, such that the link of the rocker to the body enables the degree of freedom of the camber, and
 means for measuring the couple exerted on the rocker in order to deduce from this the transverse forces undergone by the wheel,
 wherein the system is configured in such manner that the camber movement of the wheel support relative to the body has, around a mean position, an instantaneous center of rotation located within a range from 2.5 r above ground to r below ground.

17. Suspension system connecting a wheel support to a body of a vehicle, the wheel support being designed to carry a wheel of radius "r", the wheel being intended to rest on the ground via a contact area, the system comprising:
 means that confer upon the wheel support, relative to the body, a degree of freedom of camber and a degree of freedom of deflection of the suspension which are independent of one another,
 wherein the system is configured in such manner that the camber movement of the wheel support relative to the body has, around a mean position, an instantaneous center of rotation located below ground level so that the transverse forces exerted by the ground on the wheel in the contact area induce an inclination of the wheel support relative to the body in the direction of reduced camber when the transverse forces are directed towards the inside of the vehicle, and in the direction of increased camber when the transverse forces are directed towards the outside of the vehicle, and
 means for measuring the displacement of the rocker in order to deduce from this the transverse forces.

18. Suspension system connecting a wheel support to a body of a vehicle, the wheel support being designed to carry a wheel of radius "r", the wheel being intended to rest on the ground via a contact area, the system comprising:
 means that confer upon the wheel support, relative to the body, a degree of freedom of camber and a degree of freedom of deflection of the suspension which are independent of one another,
 wherein the system is configured in such manner that the camber movement of the wheel support relative to the body has, around a mean position, an instantaneous center of rotation located within a range from 2.5 r above ground to r below ground, and
 a rocker connected on the one hand to the body and on the other hand to the wheel support, such that the link of the rocker to the body enables the degree of freedom of the camber, wherein the rocker is connected to the body by two rods so configured as to allow the camber movement of the wheel support by virtue of an instantaneous rotation movement of the rocker relative to the body, wherein the rods are articulated via at least one elastomeric articulation.

19. Suspension system connecting a wheel support to a body of a vehicle, the wheel support being designed to carry a wheel of radius "r", the wheel being intended to rest on the ground via a contact area, the system comprising:
  means that confer upon the wheel support, relative to the body, a degree of freedom of camber and a degree of freedom of deflection of the suspension which are independent of one another,
  wherein the system is configured in such manner that the camber movement of the wheel support relative to the body has, around a mean position, an instantaneous center of rotation located within a range from 2.5 r above ground to r below ground, and
  a rocker connected on the one hand to the body and on the other hand to the wheel support, such that the link of the rocker to the body enables the degree of freedom of the camber, wherein the rocker is connected to the body so that it can rotate about a point located above the rocker.

* * * * *